United States Patent
Dudar et al.

(10) Patent No.: US 10,077,731 B2
(45) Date of Patent: Sep. 18, 2018

(54) METHOD FOR DETECTING FUEL SYSTEM DEGRADATION

(71) Applicant: Ford Global Technologies, LLC, Dearborn, MI (US)

(72) Inventors: Aed M. Dudar, Canton, MI (US); Russell Randall Pearce, Ann Arbor, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 14/720,464

(22) Filed: May 22, 2015

(65) Prior Publication Data

US 2016/0341141 A1 Nov. 24, 2016

(51) Int. Cl.

| F02D 41/22 | (2006.01) |
|---|---|
| G01M 3/32 | (2006.01) |
| F02M 25/08 | (2006.01) |
| F02D 33/00 | (2006.01) |
| F02M 37/00 | (2006.01) |
| B60K 15/03 | (2006.01) |

(52) U.S. Cl.
CPC ........... *F02D 41/22* (2013.01); *F02D 33/003* (2013.01); *F02M 25/089* (2013.01); *F02M 25/0809* (2013.01); *G01M 3/3209* (2013.01); *B60K 2015/03118* (2013.01); *F02D 2041/225* (2013.01); *F02M 37/0088* (2013.01); *Y02T 10/40* (2013.01)

(58) Field of Classification Search
CPC ........... F02M 25/0809; F02M 25/0818; F02M 25/0836; F02M 2025/0845; F02M 37/0088; F02M 37/0094; B60K 2015/03144

See application file for complete search history.

(56) References Cited

U.S. PATENT DOCUMENTS

| 8,019,525 B2 | 9/2011 | DeBastos et al. | |
|---|---|---|---|
| 2010/0229966 A1* | 9/2010 | Elwart | F02M 25/0809 137/485 |
| 2011/0139130 A1* | 6/2011 | Siddiqui | F02M 25/0818 123/520 |
| 2011/0240896 A1 | 10/2011 | Young et al. | |
| 2014/0069394 A1* | 3/2014 | Jentz | F02M 25/0809 123/520 |
| 2014/0107906 A1* | 4/2014 | Jentz | F02M 37/0088 701/102 |
| 2014/0316638 A1* | 10/2014 | Dudar | F02D 29/02 701/29.4 |
| 2015/0285171 A1* | 10/2015 | Dudar | F02M 25/0836 73/114.39 |

* cited by examiner

*Primary Examiner* — Stephen K Cronin
*Assistant Examiner* — Anthony L Bacon
(74) *Attorney, Agent, or Firm* — Julia Voutyras; McCoy Russell LLP

(57) ABSTRACT

Methods and systems are provided for detecting leaks in an engine fuel system coupled in a vehicle including a first fuel tank and a second fuel tank, and a canister coupled together via a three-way valve. A leak test may be initially performed on the first fuel tank by supplying vacuum to the first fuel tank. The second fuel tank may be tested for leaks immediately following the leak test on the first fuel tank by recycling vacuum from the first fuel tank.

19 Claims, 10 Drawing Sheets

| Valve Position | Solenoid A | Solenoid B | Function |
|---|---|---|---|
| 1st Position | ON | ON | Decouple canister from each of tank1 and tank 2, evacuate canister |
| 2nd Position | OFF | ON | Couple tank 1 to canister, evacuate tank 1 |
| 3rd Position | OFF | OFF | Couple canister to each of tank 1 and tank 2, recycle vacuum from tank 1 to tank 2 |
| 4th Position | ON | OFF | Couple tank 2 to canister, evacuate tank 2 |

FIG. 2E

METHOD FOR DETECTING FUEL SYSTEM DEGRADATION

FIELD

The present description relates generally to methods and systems for detecting leaks in an engine fuel system coupled in a vehicle.

BACKGROUND/SUMMARY

Vehicles may be fitted with evaporative emission control systems to reduce the release of fuel vapors to the atmosphere. For example, a fuel vapor canister packed with an adsorbent adsorbs and stores refueling vapors, running loss, and diurnal fuel vapors. At a later time, when the engine is in operation, the evaporative emission control system allows the vapors to be purged into the engine intake manifold for use as fuel. However, leaks in the emissions control system can inadvertently allow fuel vapors to escape to the atmosphere and hence leak detection routines are intermittently performed. Therein, the fuel system, including the fuel vapor canister and one or more fuel tanks coupled to the canister, is evacuated by applying a vacuum to the fuel system until a target vacuum is reached. Following the application of vacuum, the fuel system is sealed and a pressure is monitored. Based on the pressure bleed-up, fuel system leaks may be identified. Typically, in fuel systems that include coupled fuel tanks, the leak detection is performed on each of the fuel tanks to identify leaks and to monitor for degradation in the fuel tanks One example approach to identify leaks in coupled fuel tanks is shown by Jentz et al. in U.S. 2014/0107906. Therein, fuel is evacuated from a first fuel tank to a second fuel tank by opening a valve coupling the two fuel tanks and operating a jet pump. When the fuel is evacuated, the resultant change in volume to the fuel tanks causes a change in pressure that is monitored to indicate fuel system degradation.

However, the inventors herein have recognized potential issues with such systems. As one example, the amount of pressure change detected in each of the fuel tank is proportional to the amount of fuel that is transferred from one tank to the other. Herein, when the fill level is lower in the fuel tanks or if the tank size is larger as in the case of Heavy Duty (HD) vehicles (e.g., having a weight of over 14000 lbs), pressure changes in the pressure sensor coupled to the tank may be smaller and leaks may go undetected. Further, in the example of U.S. 2014/0107906, the jet pump is typically operated for a substantial amount of time, for any considerable change in pressure to be detected. As such, operating the jet pump for longer durations may increase power consumption, drain the battery, and cause noise, vibration, and harshness (NVH) issues.

The inventors herein have identified an approach to at least partly address the above issues including an example method for a fuel system in an engine comprising: applying vacuum to a first fuel tank to identify leaks in the first fuel tank; and recycling the vacuum from the first fuel tank to a second fuel tank to identify leaks in the second fuel tank following identifying leaks in the first fuel tank. In this way, degradation in the two fuel tanks may be distinguished.

For example, an engine may include a fuel system with two fuel tanks: a first fuel tank and a second fuel tank. When a leak test of the fuel system is desired, the first fuel tank may be evacuated by applying vacuum to the first fuel tank and a leak test may be performed on the first fuel tank. As such, the leak test may be performed initially on the first fuel tank if the first fuel tank has a lower fuel fill than the second fuel tank. Subsequent to completing the leak test in the first fuel tank, vacuum remaining in the first fuel tank may be transferred from the first fuel tank to the second fuel tank. Further, the leak test may then be performed on the second fuel tank.

In this way, a fuel system may be tested for degradation (e.g. leaks) in a shorter duration. By testing the fuel tank with lower fill level first, a larger vapor dome may be evacuated and a higher amount of vacuum may be provided to the fuel tank with lower fill level. This larger amount of vacuum may then be recycled to the fuel tank with higher fuel fill (or smaller vapor dome). Thus, the cycle time for evacuating the entire fuel system may be reduced. Further, in situations where a vacuum pump is utilized for the leak test, the vacuum pump may be operated for a shorter duration since vacuum is recycled in the leak test. Accordingly, power consumption of the vacuum pump may be reduced. Further still, since the vacuum pump may not be operated for longer durations, NVH from the vacuum pump may be reduced. Overall, leak tests may be more efficient and enable cost savings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2E lists different valve positions shown in FIGS. 2A, 2B, 2C, and 2D.

DETAILED DESCRIPTION

Figure 1:
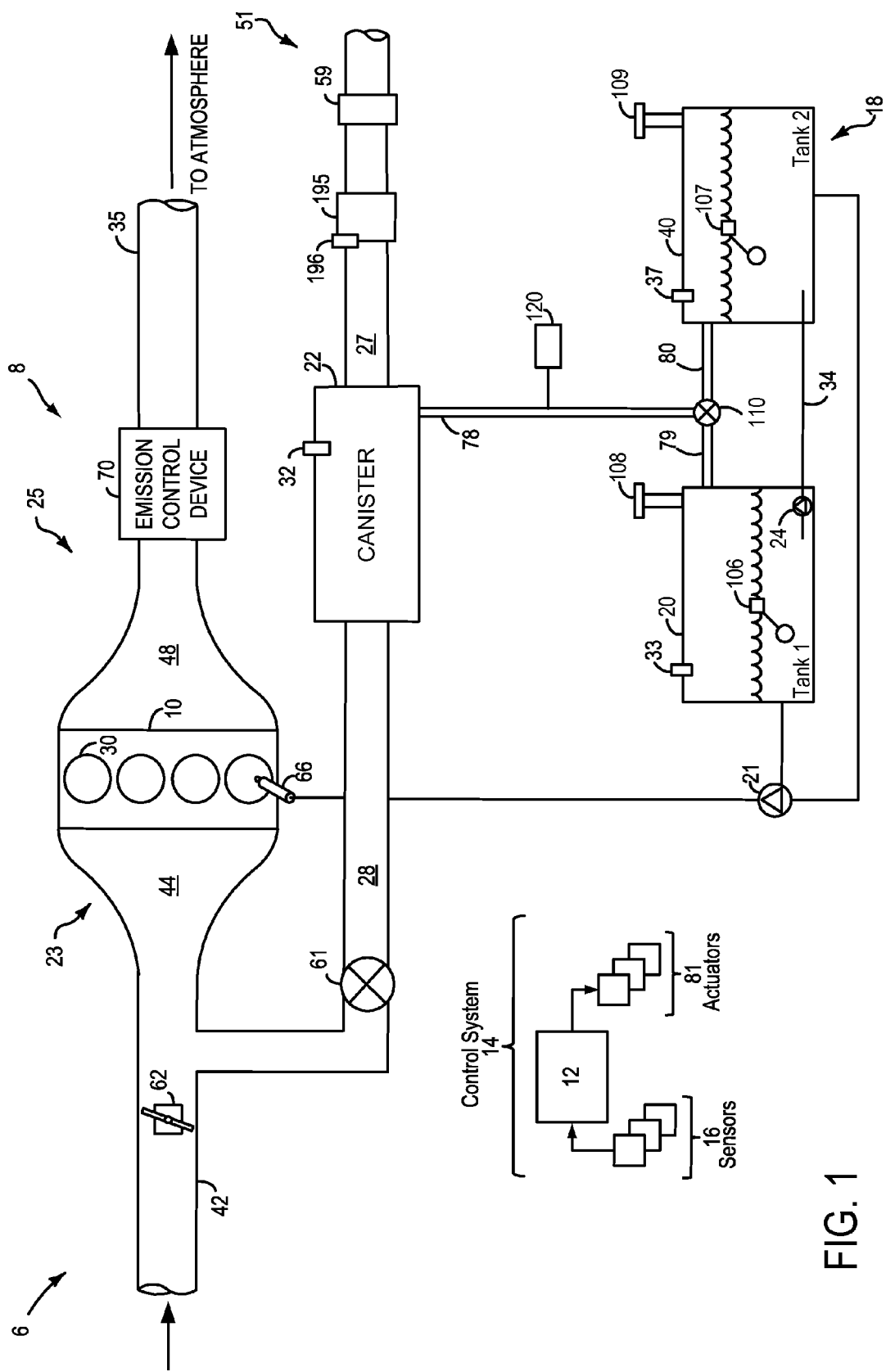
FIG. 1 shows a schematic depiction of a fuel system in an example engine with a first fuel tank and a second fuel tank coupled together by a three-way valve.
Figure 2A:
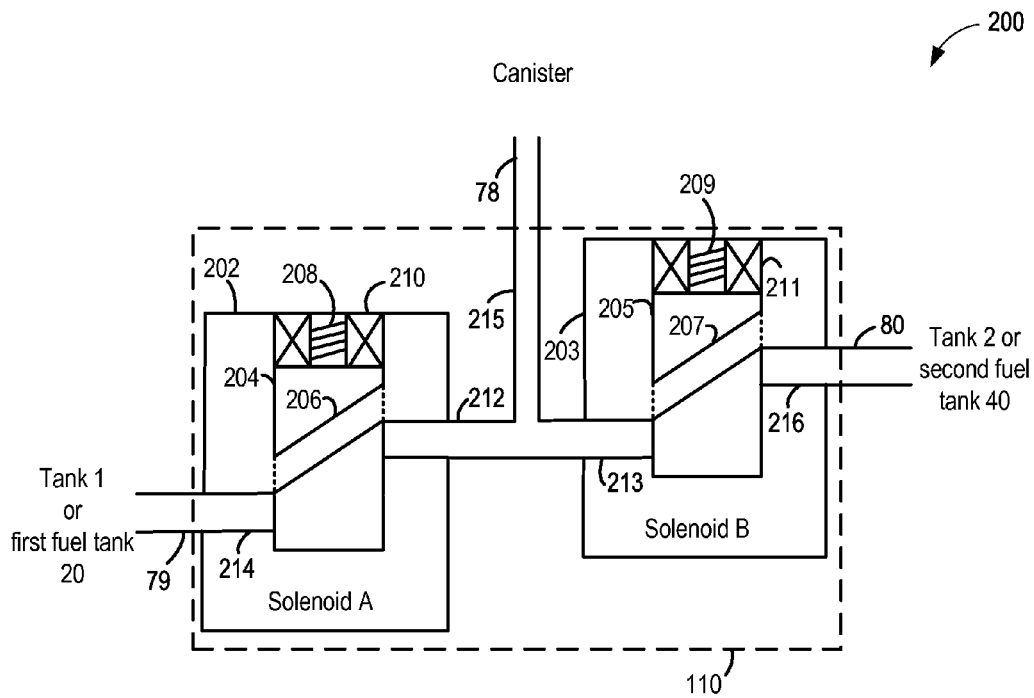
FIG. 2A shows a schematic depiction of the three way valve in a configuration to isolate the fuel vapor canister from each of the first fuel tank and the second fuel tank.
Figure 2B:
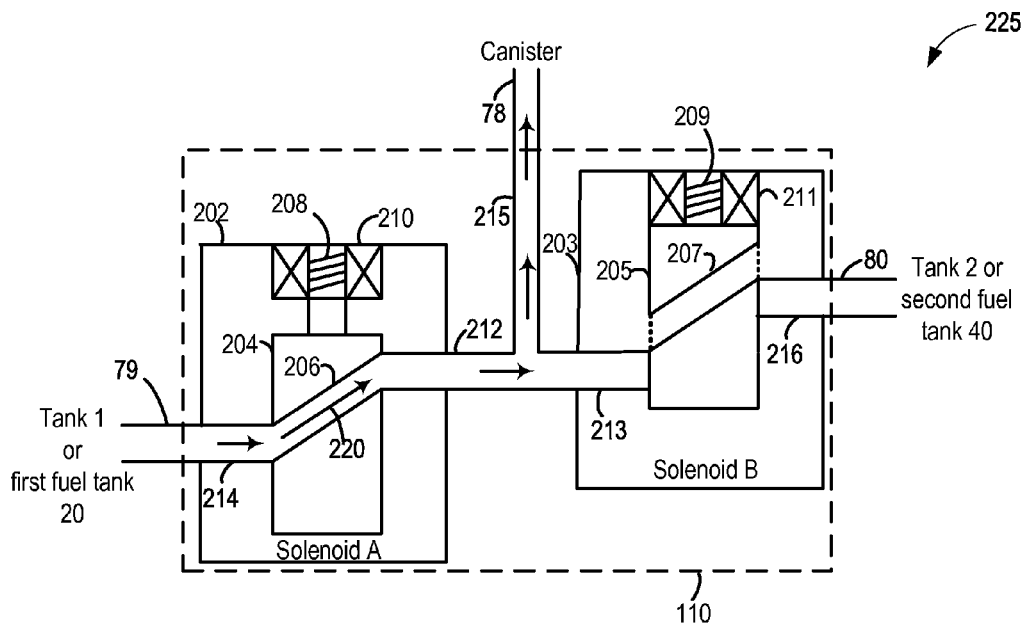
FIG. 2B shows a schematic depiction of the three way valve in a configuration to fluidically couple the fuel vapor canister to the first fuel tank.
Figure 2C:
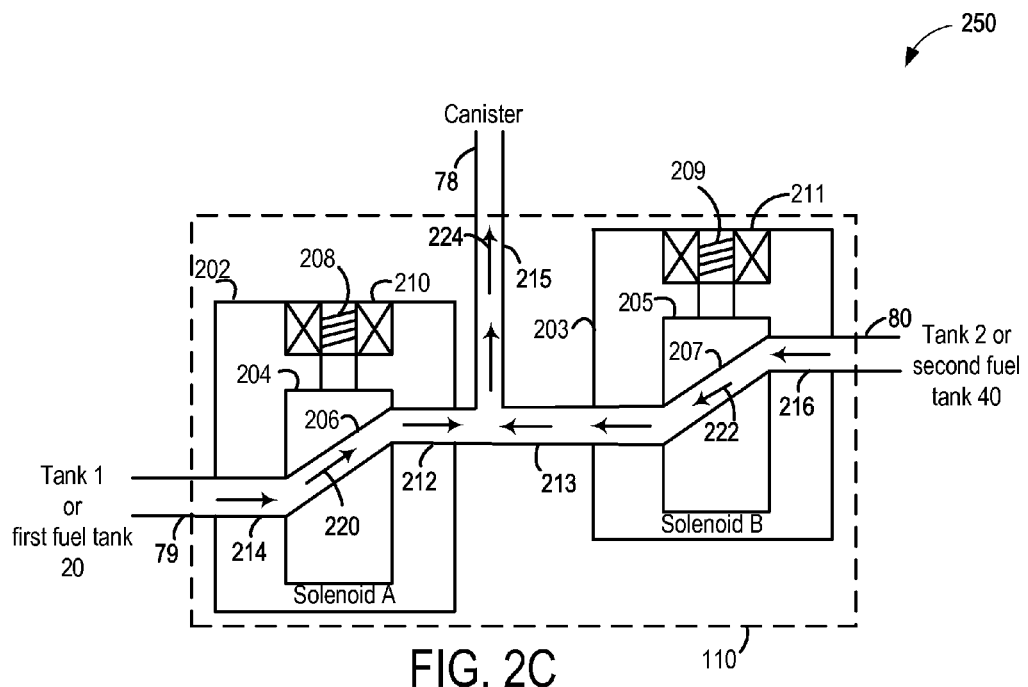
FIG. 2C shows a schematic depiction of the three way valve in a configuration to fluidically couple each of the fuel vapor canister, the first fuel tank, and the second fuel tank.
Figure 2D:
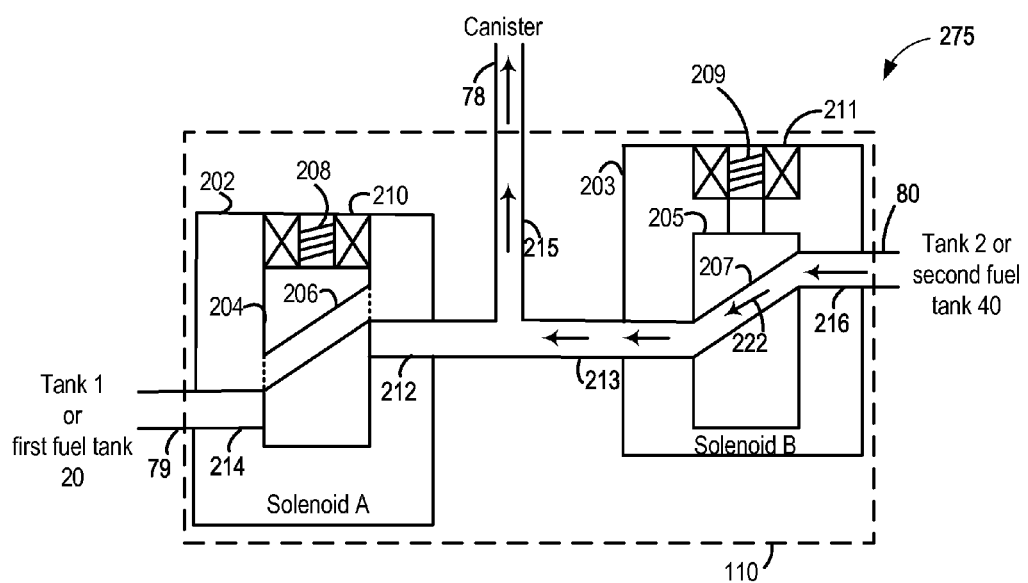
FIG. 2D shows a schematic depiction of the three way valve in a configuration to fluidically couple the fuel vapor canister to the second fuel tank.
Figure 3A:
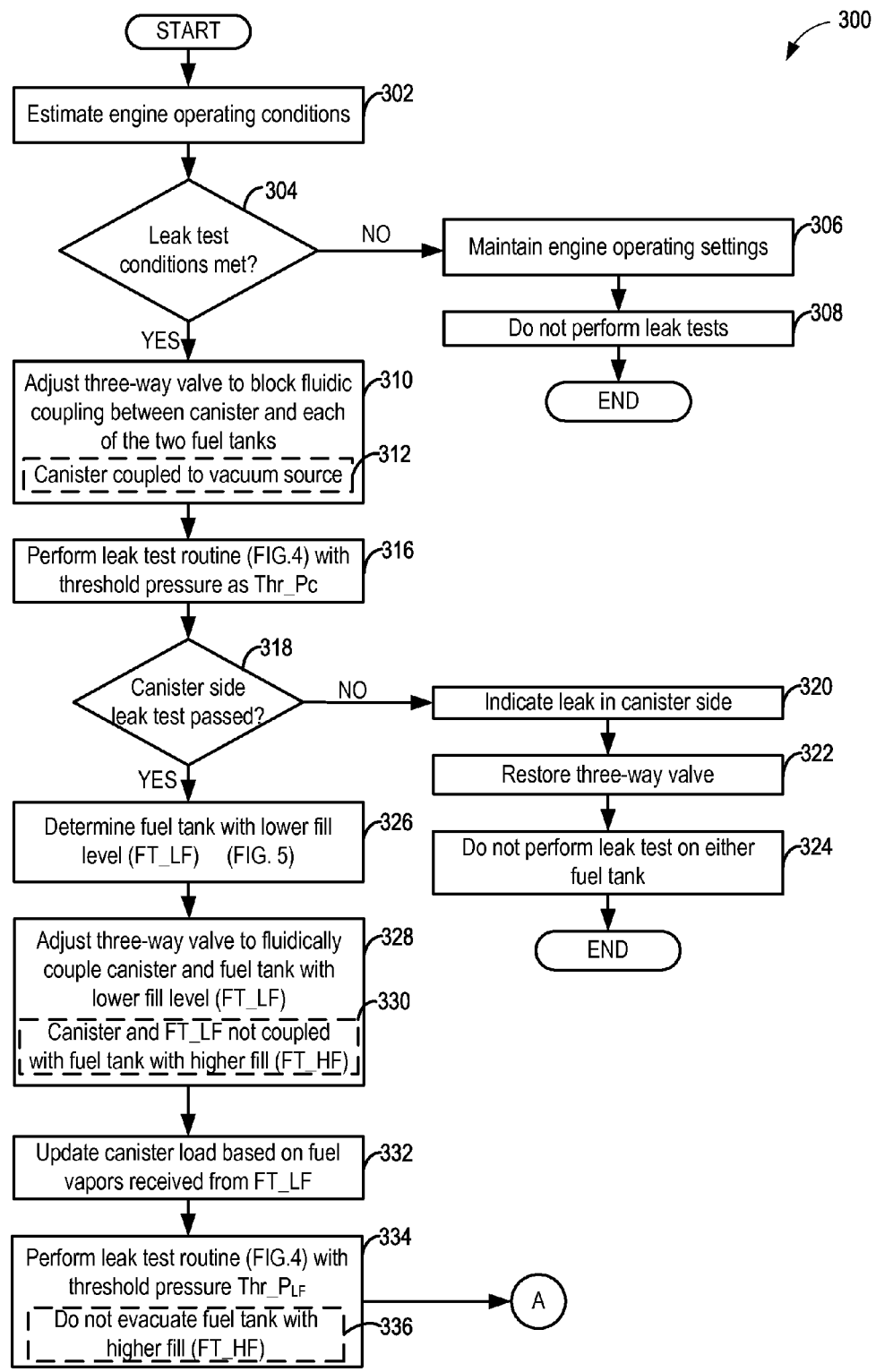
FIGS. 3A and 3B show a high level flow chart illustrating a method for adjusting the three-way valve and diagnosing the fuel system for leaks according to an embodiment of the present disclosure.
Figure 3B:
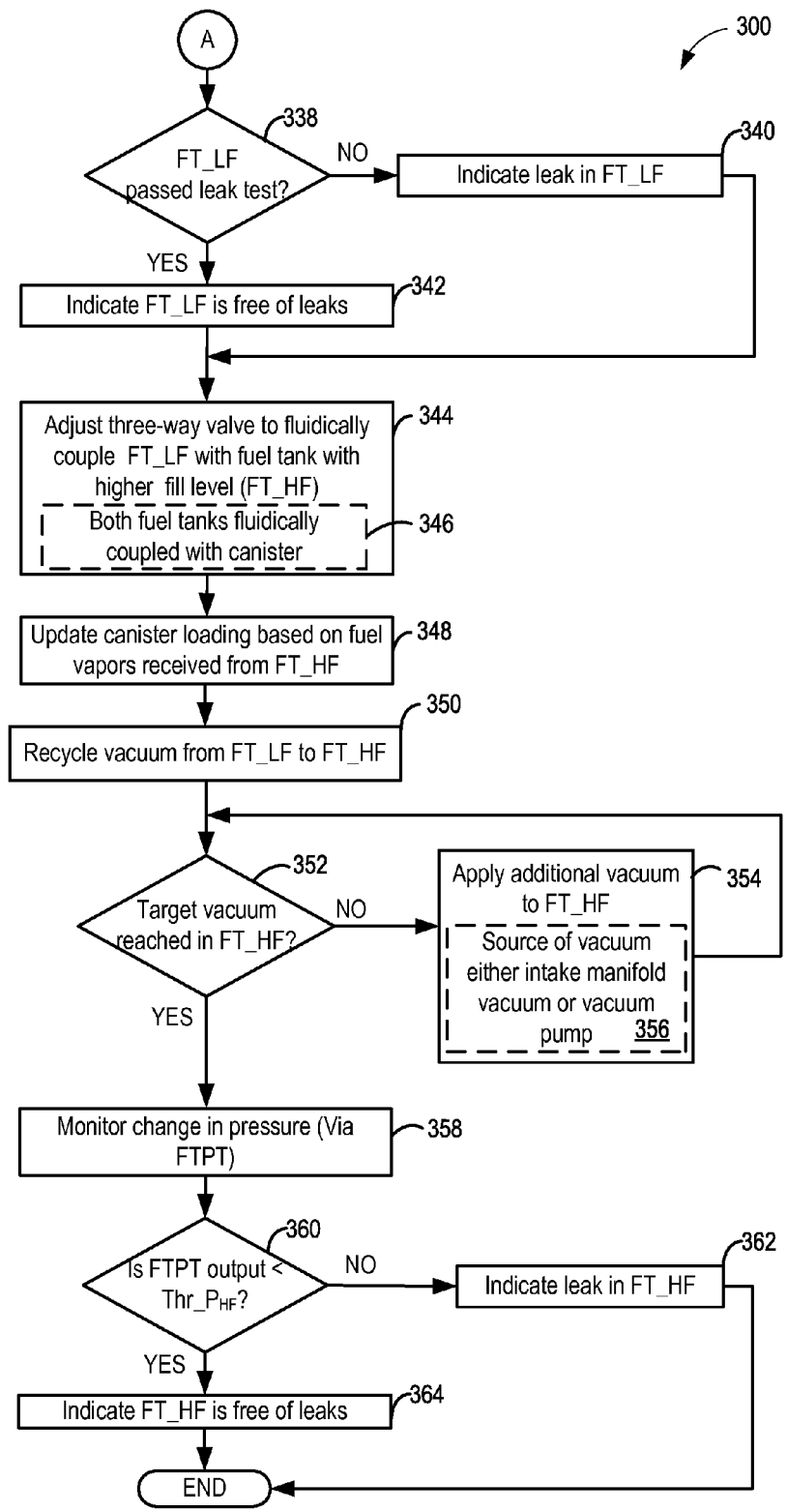
Figure 6:
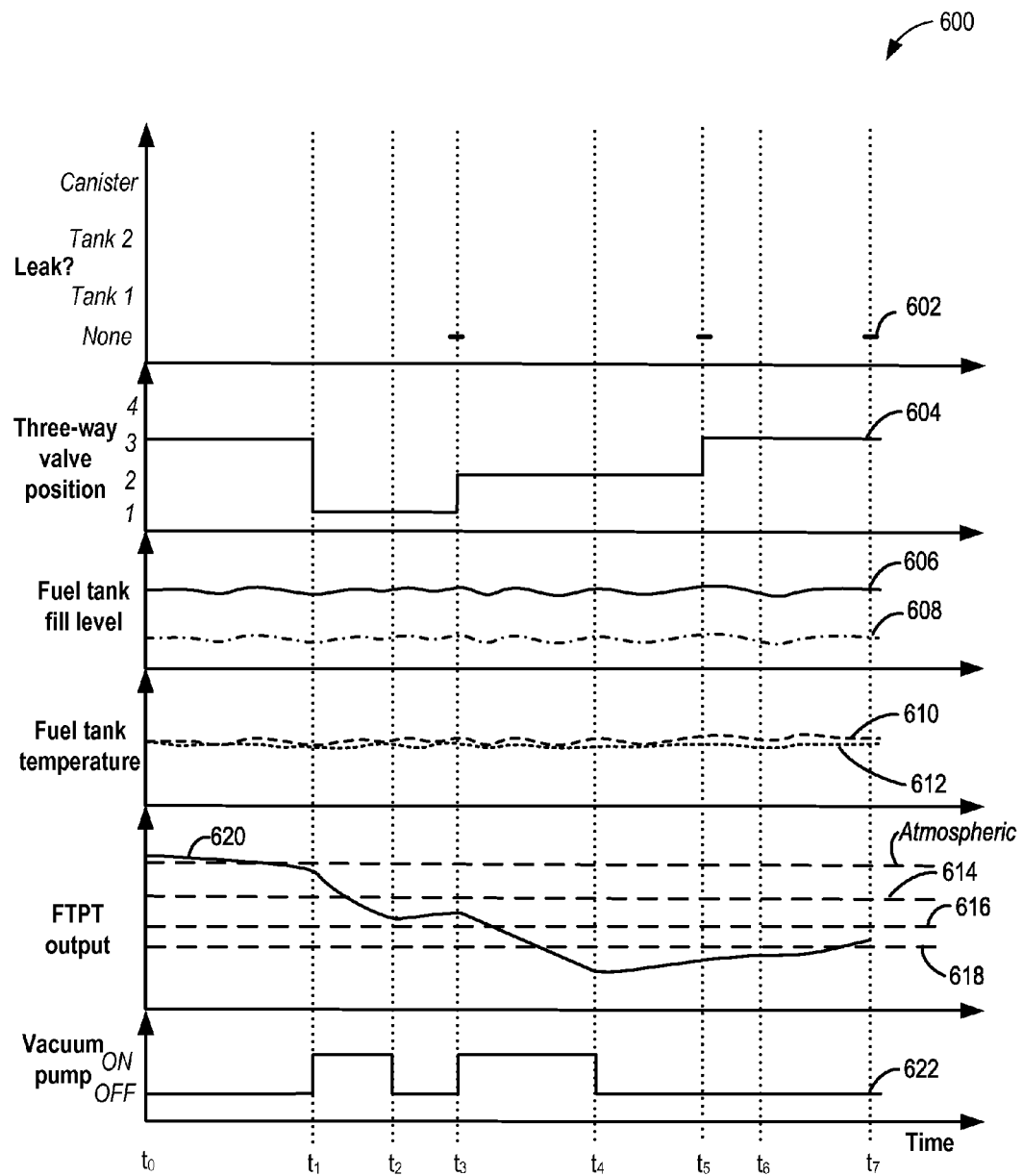
FIG. 6 is an example leak detection test when fill levels in the fuel tanks are unequal.
Figure 7:
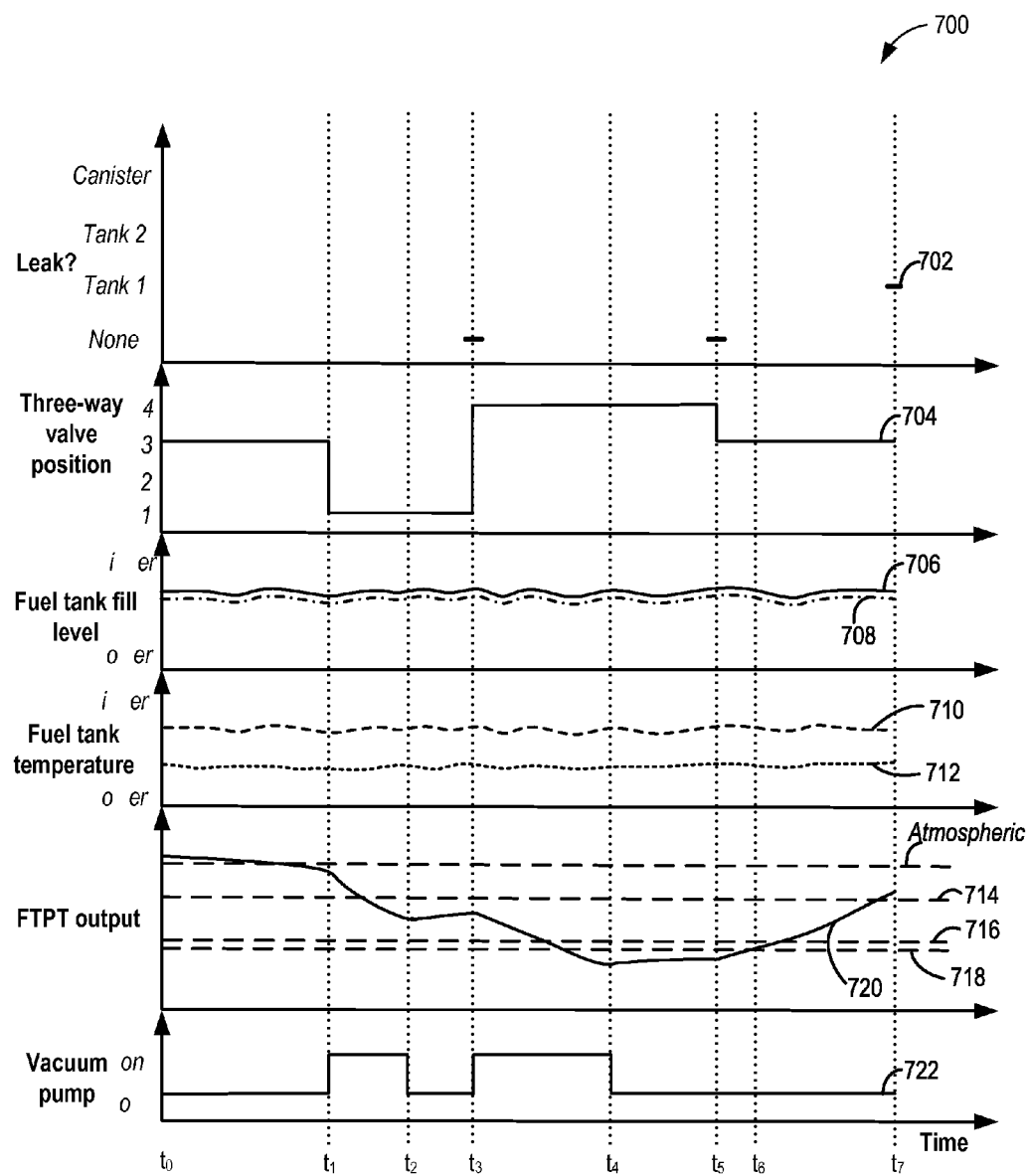
FIG. 7 is an example leak detection test when the fill levels in the fuel tanks are substantially equal.

The following description relates to systems and methods for detecting leaks in an example fuel system with at least two fuel tanks included in an engine system, such as the engine system of FIG. 1. The example fuel system, as shown in FIG. 1, may include a fuel vapor canister, a first fuel tank, and a second fuel tank coupled to each other by a three-way valve. The three-way valve may be adjusted to a plurality of positions, as shown in FIGS. 2A-2D, based on a desired leak test and/or existing engine conditions. The positions of the three-way valve may enable and/or block fluidic communication between the fuel vapor canister, the first fuel tank, and the second fuel tank (FIG. 2E). If a leak test (FIG. 4) of the fuel system is desired, a controller may be configured to perform a routine, such as the routine of FIG. 3A and FIG. 3B, to test the fuel vapor canister for leaks at first followed by a leak test on a fuel tank with lower fill level as determined in FIG. 5. Vacuum may be applied initially to the fuel tank with lower fill for detecting leaks, and after the leak test on the fuel tank with lower fill is completed, vacuum from the fuel tank with lower fill may be recycled to the fuel tank with higher fill (FIG. 3). If the first fuel tank and the second fuel tank have substantially similar fill levels, the leak test may be performed initially on one of the two fuel tanks based on parameters such as fuel temperature (FIG. 7). An example leak detection test when the fill level of the first tank is lower than the fill level of the second tank is shown in FIG. 6. In this way, the fuel system including the fuel vapor canister, the first fuel tank, and the second fuel tank may be diagnosed for degradation in a shorter period of time.

FIG. 1 shows a schematic depiction of a vehicle system 6 that can derive propulsion power from engine system 8. The vehicle system 6 includes an engine system 8 coupled to an emissions control system 51 and a fuel system 18. Vehicle system 6 may be a conventional vehicle powered solely through combustion, or it may be a hybrid vehicle system that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a first fuel tank 20 (labeled "Tank 1" in FIG. 1) and a second fuel tank 40 (labeled "Tank 2" in FIG. 1) both of which are coupled to a fuel vapor canister 22 via a common three-way valve 110. Herein, the first fuel tank 20 and the second fuel tank 40 may be further coupled to each other via the three-way valve 110, and may be referred to as coupled tanks During a fuel tank refueling event, fuel may be pumped into the first fuel tank 20 from an external source through refueling door 108, and into the second fuel tank 40 from the external source through refueling door 109. In alternate embodiments, the fuel may be pumped into one of the two fuel tanks via a single refueling door attached to either of the fuel tanks, and fuel may be transferred between the tanks by operating a jet pump 24. As such, fuel may be transferred from first fuel tank 20 to second fuel tank 40 via fuel transfer passage 34 by operating jet pump 24. Likewise, fuel may be transferred from second fuel tank 40 to first fuel tank via fuel transfer passage 34 by operating jet pump 24.

The fuel tanks may hold a plurality of fuel blends, including fuel with a range of alcohol concentrations, such as various gasoline-ethanol blends, including E10, E85, gasoline, etc., and combinations thereof. A fuel level sensor 106 located in the first fuel tank 20 may provide an indication of a fill level (also termed, fuel fill level) of the first fuel tank 20 to a controller 12. Similarly a fuel level sensor 107 located in the second fuel tank 40 may provide fill level of the second fuel tank to the controller 12. As depicted, fuel level sensors 106 and 107 may each comprise a float connected to a variable resistor. Alternatively, other types of fuel level sensors may be used.

The jet pump 24 may transfer fuel from the fuel tank 40 to the fuel tank 20, based on a signal received from controller 12, for example. Jet pump 24 may have inlet positioned in the second fuel tank 40 and an outlet positioned in the first fuel tank 20. However, under some conditions, jet pump 24 may operate in the reverse direction to transfer fuel from the first fuel tank to the second fuel tank 40. Further, in some embodiments, the jet pump 24 and a fuel pump 21 may be combined into a single pump unit.

The fuel pump 21 is configured to pressurize fuel delivered from each of the fuel tank 20 and fuel tank 40 to the injectors of the engine 10, such as example injector 66. While only a single injector 66 is shown, additional injectors are provided for each cylinder. It will be appreciated that fuel system 18 may be a return-less fuel system, a return fuel system, or various other types of fuel system. Fuel vapors generated in fuel tank 20 may be routed to fuel vapor canister 22 (also termed, canister 22), via conduits 79 and 78, before being purged to the engine intake 23. Specifically, fuel vapors from first fuel tank 20 may flow through conduit 79, past three-way valve 110 into conduit 78, and thereon into canister 22. Similarly, fuel vapors generated in fuel tank 40 may be routed to fuel vapor canister 22, via conduits 80 and 78, before being purged to the engine intake 23. Herein, fuel vapors from the second fuel tank 40 may flow through conduit 80, past three-way valve 110, through conduit 78 into canister 22. In FIG. 1, a single fuel pump 21 is shown to deliver fuel from each of the fuel tanks In alternate embodiments, two independent fuel pumps may deliver fuel from each of the corresponding fuel tanks to the injectors of the engine 10. Herein, the fuel pumps may each be controlled by the controller 12.

Conduit 79 may fluidically couple the first fuel tank 20 to the three-way valve 110, conduit 80 may fluidically couple the second fuel tank 40 to the three-way valve 110, and conduit 78 may further fluidically couple the three-way valve 110 to the fuel vapor canister 22. Herein, three-way valve 110 may be a common valve shared between conduit 78, conduit 79, and conduit 80. The three-way valve 110 may be operated in a plurality of positions described in detail with respect to FIGS. 2A-2E. For example, during a fuel system leak detection test of each of the fuel vapor canister 22, the first fuel tank 20, and the second fuel tank 40, described below, the three-way valve 110 may be adjusted to various positions. The three-way valve may be a solenoid valve which may be modulated via controller 12. While two separate fuel tanks are depicted in FIG. 1, it is to be understood that a single common fuel tank with multiple separate chambers may also be used without departing from the scope of this disclosure. Further, the first fuel tank 20 is referred to as the first fuel tank or tank 1, and the fuel tank 40 is referred to as the second fuel tank or tank 2. In alternate embodiments, fuel tank 20 may be tank 2 and fuel tank 40 may be tank 1.

It will be noted that fuel transfer passage 34 is distinct from conduits 78, 79, and 80. Specifically, fuel transfer passage 34 may allow flow of liquid fuel while conduits 78, 79, and 80 may be utilized for flow of fuel vapors, and not liquid fuel.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in the fuel vapor canister 22 may be purged to the engine intake 23 by opening a canister purge valve 61. While a single canister 22 is shown, it will be appreciated that fuel system 18 may include any number of canisters.

The canister 22 includes a vent line 27 for routing gases out of the canister 22 to the atmosphere when storing, or trapping, fuel vapors from each of the first and the second fuel tanks The vent line 27 may also allow fresh air to be drawn into the fuel vapor canister 22 when purging stored fuel vapors to engine intake 23 via a purge line 28 and canister purge valve 61. While this example shows vent line 27 communicating with fresh, unheated air, various modifications may also be used. In some examples, the vent line 27 may include an air filter 59 disposed between the canister 22 and the atmosphere.

The vehicle system 6 may further include a control system 14. Control system 14 is shown receiving information from a plurality of sensors 16 (various examples of which are described herein) and sending control signals to a plurality of actuators 81 (various examples of which are described herein). As one example, sensors 16 may include fill level sensors 106 and 107, fuel tank temperature sensors 33 and 37, and pressure sensor 120. Other sensors such as additional pressure, temperature, air/fuel ratio, and composition sensors may be coupled to various locations in the vehicle system 6. As another example, the actuators may include fuel injector 66, valve 110, purge valve 61, vent valve (if included), fuel pump 21, jet pump 24, and throttle 62. The control system 14 may include the controller 12. The controller 12 receives signals from the various sensors of FIGS. 1 and 2 and employs the various actuators of FIGS. 1 and 2 to adjust engine operation based on the received signals and instructions stored on a memory of the controller.

Leak detection tests or routines may be intermittently performed on the fuel system 18 by controller 12 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or by using engine intake manifold vacuum. FIG. 1 depicts vacuum pump 195 coupled to vent line 27 between the canister 22 and the atmosphere. Vacuum pump 195 may apply negative pressure to the fuel system 18 when administering a leak test. In some embodiments, the vacuum pump may be configured to be reversible. In other words, the vacuum pump may be configured to apply either a negative pressure or a positive pressure on the fuel system.

When engine intake manifold vacuum is applied to the fuel system 18, the canister purge valve 61 may be opened. Additionally, a canister vent valve (if included) may be closed to seal the fuel system. Following the applying of vacuum to the fuel system, a change in pressure (e.g., an absolute change or a rate of change) may be monitored to determine degradation of the fuel system.

In alternative embodiments, leak tests may also be performed by an evaporative leak check module (ELCM). The ELCM may include a pump (e.g. a vacuum pump), a reference orifice and a pressure sensor. The controller 12 may determine a change in pressure based on the size of the orifice and any deviation in pressure from the determined pressure change may indicate a degraded fuel system.

A pressure sensor 120 (also known as fuel tank pressure transducer FTPT) may be coupled to the fuel system 18 for providing an estimate of a fuel system pressure. In one example, the fuel system pressure is a fuel vapor canister pressure, wherein pressure sensor 120 coupled to the canister 22 may estimate a canister pressure or vacuum level in the canister. By operating the valve 110 in a plurality of positions described in FIGS. 2A-2E, it may be possible for the pressure sensor 120 to estimate a fuel tank pressure and/or fuel tank vacuum level of each of the fuel tanks in fuel system 18. As shown, fuel system 18 includes a single pressure sensor 120 coupled to conduit 78. Pressure sensor 120 may be positioned between the three-way valve 110 and canister 22. Though the depicted embodiment shows a single pressure sensor for monitoring pressure in the fuel vapor canister 22, first fuel tank 20, and second fuel tank 40, other embodiments may include additional pressure sensors coupled to each of the fuel tanks FIGS. 2A-2D show schematic depictions of an example three-way valve, such as three-way valve 110 of FIG. 1, in various positions in accordance with the present disclosure. Herein the three-way valve may include two solenoids, a first solenoid 202 (labeled solenoid A) and a second solenoid 203 (labeled solenoid B). As shown in view 200 of FIG. 2A, the three-way valve 110 may be located to fluidically couple or decouple conduits 78, 79, and 80. Specifically, three-way valve 110 may enable fluidic coupling between each of the canister 22, the first fuel tank 20, and the second fuel tank 40. Furthermore, three-way valve 110 may block fluidic communication between each of canister 22, the first fuel tank 20, and the second fuel tank 40.

The first solenoid 202 may include an armature or plunger 204, a stator 208, an electric coil 210, and a path 206. First solenoid 202 (Solenoid A) further includes a passage 214 fluidically connecting solenoid A to the conduit 79, and further connecting solenoid A to first fuel tank 20 (Tank 1). Similarly, the second solenoid 203 may include an armature 205, a stator 209, an electric coil 211, and a path 207. Second solenoid 203 (Solenoid B) further includes a passage 216 fluidically connecting solenoid B to the conduit 80, and further connecting solenoid B to second fuel tank 40 (Tank 2). In addition, the three-way valve 110 may include a channel 212 fluidically connected to channel path 213 and further to channel 215. Channel 215 of the three-way valve 110 is fluidically connected to conduit 78 which is further coupled fluidically to the canister 22. In addition, channels 212 and 213 in three-way valve 110 may fluidically couple solenoid A (first solenoid 202) to solenoid B (second solenoid 203).

When the electric coil 210 is energized or solenoid A is ON, a current is passed through the electric coil thereby creating a magnetic force that magnetizes stator 208 and attracts the armature 204 towards stator 208. In this configuration, the path 206 may be disconnected or isolated from each of passage 214 and channel 212, as shown in FIG. 2A. In other words, when first solenoid 202 is energized, passage 214 is blocked from channel 212. To elaborate, first fuel tank 20 (Tank 1) may be isolated from each of canister 22 and second fuel tank 40 when Solenoid A is energized.

When solenoid B (second solenoid 203) is energized by flowing electricity through electric coil 211, stator 209 may be magnetized causing armature 205 to be pulled towards stator 209, thereby disconnecting the path 207 from each of the channel 213 and passage 216.

As shown in view 200, the three-way valve 110 may be placed in a first position, wherein both solenoid A and solenoid B are energized. In the first position, the canister 22 may be isolated from each of tank 1 and tank 2. Thus, in the first position, fuel vapors from both the fuel tanks may be blocked from entering the fuel vapor canister 22. By applying vacuum to the canister 22 while operating the three-way valve 110 in the first position, the canister may be evacuated, and the canister may be monitored for leaks by the pressure sensor 120. Applying vacuum during engine-on conditions may include either operating the vacuum pump 195 or applying intake manifold vacuum by opening the CPV 61, for example. In another example, the canister 22 may be purged while operating the three-way valve 110 in the first position. Operation of solenoids A and B (and thus three-way valve 110) may be controlled via signals received from the controller 12.

In a second position of the three-way valve 110 (shown in view 225 of FIG. 2B), solenoid A may be de-energized, while solenoid B may be energized. When solenoid A is de-energized or OFF, no current flows through the coil 210, thus the stator 208 may not be magnetized. As a result, there may be no magnetic force acting on the armature 204 and the armature 204 may be released as shown.

In this second position, the path 206 may be fluidically coupled to each of the passage 214 and channel 212, thus fluidically coupling first fuel tank 20 (Tank 1) to the canister 22 via conduit 79, passage 214, path 206, channels 212 and 215, and conduit 78. To elaborate, fuel vapors and/or air may flow from Tank 1 (indicated by arrows 220) into fuel vapor canister 22 via conduit 79, through passage 214, across path 206, past channel 212, through channel 215, into conduit 78, and thereon into canister 22. In addition, since solenoid B is energized, tank 2 may be isolated from each of the canister 22 and tank 1. In other words, when three-way valve 110 is placed in the second position, second fuel tank 40 may be decoupled. Said another way, fluidic communication between second fuel tank 40 and each of first fuel tank 20 and canister 22 is blocked. To elaborate, fluidic communication between second fuel tank 40 and first fuel tank 20 is blocked. Simultaneously, fluidic communication between second fuel tank 40 and canister 22 may be impeded.

In this way, by operating the three-way valve 110 in the second position, tank 1 may be fluidically coupled to the canister, while isolated from tank 2. Fuel vapors from tank 1 (arrows 220) may be routed to the canister 22 when the three-way valve 110 is operated in the second position. In addition, when the valve is in the second position, tank 1 may be fluidically coupled to each of canister 22, and a vacuum source. If the engine is activated and operating, the vacuum source may be one of the vacuum pump 195 and intake manifold vacuum. If the engine is deactivated and shut down to rest during a key-off condition, the vacuum source may primarily be vacuum pump 195. Thus, vacuum from the vacuum source may be applied to tank 1 to determine presence of leaks in tank 1 by monitoring the output of the pressure sensor 120.

In another example, the three-way valve 110 may be operated in the second position, e.g., for a pre-determined duration, during refueling operations, and/or selected purging conditions, to direct fuel vapors and/or air from the first fuel tank 20 to canister 22. By operating the three-way valve in the second position during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits.

In a third position of the three-way valve 110 (shown in view 250 of FIG. 2C), both solenoids A and B may be de-energized. As explained above, when solenoid A is de-energized, tank 1 may be fluidically coupled to the canister 22, such that fuel vapors generated in tank 1 (arrows 220) may be directed towards the canister 22, where they may be stored until purged into the engine intake manifold as fuel. When solenoid B is de-energized or OFF, no current flows through the electric coil 211. Thus, the stator 209 may not be magnetized thereby releasing armature 205 as shown. In the third position, the path 207 may be fluidically coupled to each of the channel 213 and passage 216, thus fluidically coupling tank 2 to each of the canister 22 and tank 1.

As such, the three-way valve may be a normally open valve, implying that, each of solenoid A and solenoid B may be normally de-energized, thus fluidically coupling the canister 22 with each of tank 1 and tank 2. In this configuration, fuel vapors generated in each of first fuel tank 20 (arrows 220) and second fuel tank 40 (arrows 222) may be directed towards the canister 22 where they may be stored until being purged into the engine intake manifold at a later time. In addition, when the three-way valve is in the third position, each of tank 1 and tank 2 may be coupled to the canister 22, and may also be further coupled to the vacuum source.

In a fourth position of the three-way valve 110 (shown in view 275 of FIG. 2D), solenoid A may be energized, while solenoid B may be de-energized. By operating the three-way valve 110 in the fourth position, second fuel tank 40 (Tank 2) may be fluidically coupled to the canister 22, while being isolated from first fuel tank 20 (Tank 1). In the fourth position, fuel vapors from tank 2 may be routed to the canister 22. In addition, when the three-way valve is in the fourth position, tank 2 may be fluidically coupled to the canister 22, and further coupled fluidically to the vacuum source (via the canister). In this configuration, it may be possible to apply vacuum to tank 2 from the vacuum source, and further determine leaks in tank 2 by monitoring the output of the pressure sensor 120.

In other words, when three-way valve 110 is placed in the fourth position, first fuel tank 20 may be decoupled from each of the second fuel tank 40 and the canister 22. Said another way, fluidic communication between first fuel tank 20 and each of second fuel tank 40 and canister 22 is blocked. To elaborate, fluidic communication between second fuel tank 40 and first fuel tank 20 is blocked. Simultaneously, fluidic communication between first fuel tank 20 and canister 22 may be impeded.

Table 295 of FIG. 2E lists different valve positions shown in FIGS. 2A, 2B, 2C, and 2D. Thus, by operating the three-way valve 110 in the first position, it may be possible to decouple the canister from each of tank 1 and tank 2, and thereby evacuate the canister by applying vacuum to the canister. The canister is isolated from each of the first fuel tank and the second fuel tank by energizing both solenoids in the three-way valve. Further, by operating the three-way valve 110 in the second or the fourth position, it may be possible to fluidically couple either tank 1 or tank 2 to the canister. To elaborate, by energizing one solenoid of the two solenoids in the three-way valve, one of the two fuel tanks may be fluidically coupled to the canister, and thereon to a vacuum source. For example, by energizing only the first solenoid 202, the second fuel tank 40 may be fluidically coupled to the canister 22 (and the vacuum source) while first fuel tank 20 is isolated from each of the canister 22 and the second fuel tank 40. In another example, by energizing the second solenoid 203 alone, the second fuel tank 40 may be isolated from each of the canister 22 (and the vacuum source) and the first fuel tank 20. At the same time, the first fuel tank may be in fluidic communication with the canister 22 and the vacuum source.

By placing the three-way valve 110 in the third position, it may be possible to fluidically couple the canister 22 to each of tank 1 and tank 2. Herein, each of the solenoids in the three-way valve may be de-energized. By de-energizing both solenoids in the three-way valve, the canister may be in fluidic communication with each of the first fuel tank and the second fuel tank. The three-way valve 110 may be held for longer durations in the third position, where the canister 22 may be coupled to each of the two fuel tanks. Herein, the three-way valve 110 may be a normally open valve wherein the solenoids are held de-energized. The controller 12 may receive signals to adjust the three-way valve 110 into the plurality of positions described above based on engine operating conditions.

It will be appreciated that the positions of the three-way valve may be labeled differently than those in Table 295 without departing from the scope of this disclosure. For example, the position of the three-way valve which includes energizing solenoid A (first solenoid 202) and de-energizing Solenoid B (second solenoid 203) at the same time may be termed a "second position" in alternate embodiments, instead of being termed "first position" as in Table 295.

FIGS. 2A-2E show the operation of a single three-way valve 110 in various positions according to embodiments of the present disclosure. However, similar functionality may be attained by operating a plurality of valves positioned between each of the canister, the first fuel tank 20, and the second fuel tank 40. For example, a valve may be positioned in each of the conduits 79, 78 and 80, and the valve may be a solenoid valve. The controller 12 may adaptively adjust the operation of the plurality of valves, to selectively couple and/or decouple each of the canister, the first fuel tank 20, and the second fuel tank 40. For example, to evacuate the first fuel tank 20, the valves positioned on conduits 79 and 80 may be opened, while the valve positioned on conduit 80 may be closed. The opening and closing of the valves may be enabled by de-energizing and energizing the solenoids of the valves.

In order to identify leaks in the coupled fuel tanks, each of the coupled fuel tanks may be evacuated sequentially, and the leak detection test may be performed on each of the tanks For example, negative pressure (also termed, vacuum) may be applied to each of the coupled fuel tanks in a sequential manner. However, these tests may take a longer time, particularly in heavy duty (HD) vehicles with larger fuel tanks Accordingly, leak testing may be performed on coupled fuel tanks by using recycled vacuum as will be described in further detail in reference to FIGS. 3A and 3B. Briefly, a first tank of the coupled fuel tanks may be evacuated at first by applying vacuum to the first tank and performing a leak test on the first tank. As such, the leak test may be performed initially on the first tank if the first tank has a lower fuel fill than the second tank. Subsequent to completing the leak test in the first tank, vacuum remaining in the first tank may be transferred to the second tank. A leak test may then be performed on the second tank. In this way, a fuel system with coupled fuel tanks may be tested for degradation (e.g., leaks) in a shorter duration.

Returning to FIG. 1, fuel system 18 may be operated by the controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may operate the three-way valve 110 in one or more of second, third, and fourth positions, while closing canister purge valve (CPV) 61 to direct refueling vapors into canister 22 while preventing fuel vapors from being directed into the intake manifold. As another example, the fuel system may be operated in a refueling mode (e.g., when fuel tank refueling is requested by a vehicle operator), wherein the controller 12 may operate the three-way valve 110 in one of second, third, and fourth positions, while maintaining canister purge valve 61 closed, to depressurize the fuel tanks before allowing fuel to be added therein. As yet another example, the fuel system may be operated in a canister purging mode (e.g., after an emission control device light-off temperature has been attained and with the engine running), wherein the controller 12 may open canister purge valve 61 while operating the three-way valve 110 in the first position. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

FIGS. 3A and 3B illustrate an example method 300 to perform leak tests on each of the canister, the first fuel tank, and the second fuel tank. Specifically, each of the fuel tanks may be tested for leaks in a sequential manner by using recycled vacuum. As such, method 300 will be described with relation to the systems shown in FIGS. 1, 2A, 2B, 2C, and 2D, but it should be understood that similar routines may be used with other systems without departing from the scope of this disclosure. Instructions for carrying out method 300 and the rest of the methods (e.g. methods 400 and 500) included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIGS. 1, 2A, 2B, 2C, and 2D, to adjust engine operation, according to the methods described below.

At 302, method 300 includes estimating and/or measuring engine operating conditions. Engine operating conditions determined may include, for example, engine speed, engine temperature, air-fuel ratio, exhaust temperature, canister load, fuel level in the fuel tank, ambient conditions such as barometric pressure and ambient temperature, fuel tank pressure, fuel tank temperature, etc.

At 304, method 300 includes determining if leak test conditions are met. Leak detection tests or routines may be intermittently performed on the fuel system by a controller (e.g., controller 12 of FIG. 1) to confirm that the fuel system is not degraded. For example, if a certain time has elapsed since the previous leak detection test was performed, then leak test conditions may be considered met. As other examples, if the output of the pressure sensor of the fuel system (e.g., such as pressure sensor 120 of FIG.1) is above a threshold, then the controller may consider leak test conditions met. If one or more of the leak test conditions are not fulfilled, then the leak conditions may not be considered met and method 300 proceeds to 306 where the engine operation settings may be maintained. Method 300 then proceeds to 308 where leak test(s) may not be performed by the controller and the method ends.

If leak test conditions are met at 304, method 300 proceeds to 310 where a three way valve (such as three-way valve 110 in FIGS. 1, 2A, 2B, 2C, and 2D) may be adjusted to selectively block fluidic coupling between the canister and each of the two fuel tanks As such, both solenoids of the three-way valve may be energized, thereby decoupling or isolating the canister from both the fuel tanks Normally, the canister may be fluidically coupled to each of the two fuel tanks In the example of three-way valve 110 of FIG. 1, the three-way valve may be adjusted to a first position at 310 (as shown in FIG. 2A). The canister may be coupled to a vacuum source at 312. Method 300 then proceeds to 316 where a leak test, such as that described in FIG. 4, may be performed with a threshold pressure for the leak test routine being set as Thr_Pc. Specifically, the canister may be tested for leaks based on a threshold canister pressure Thr_Pc.

Figure 4:
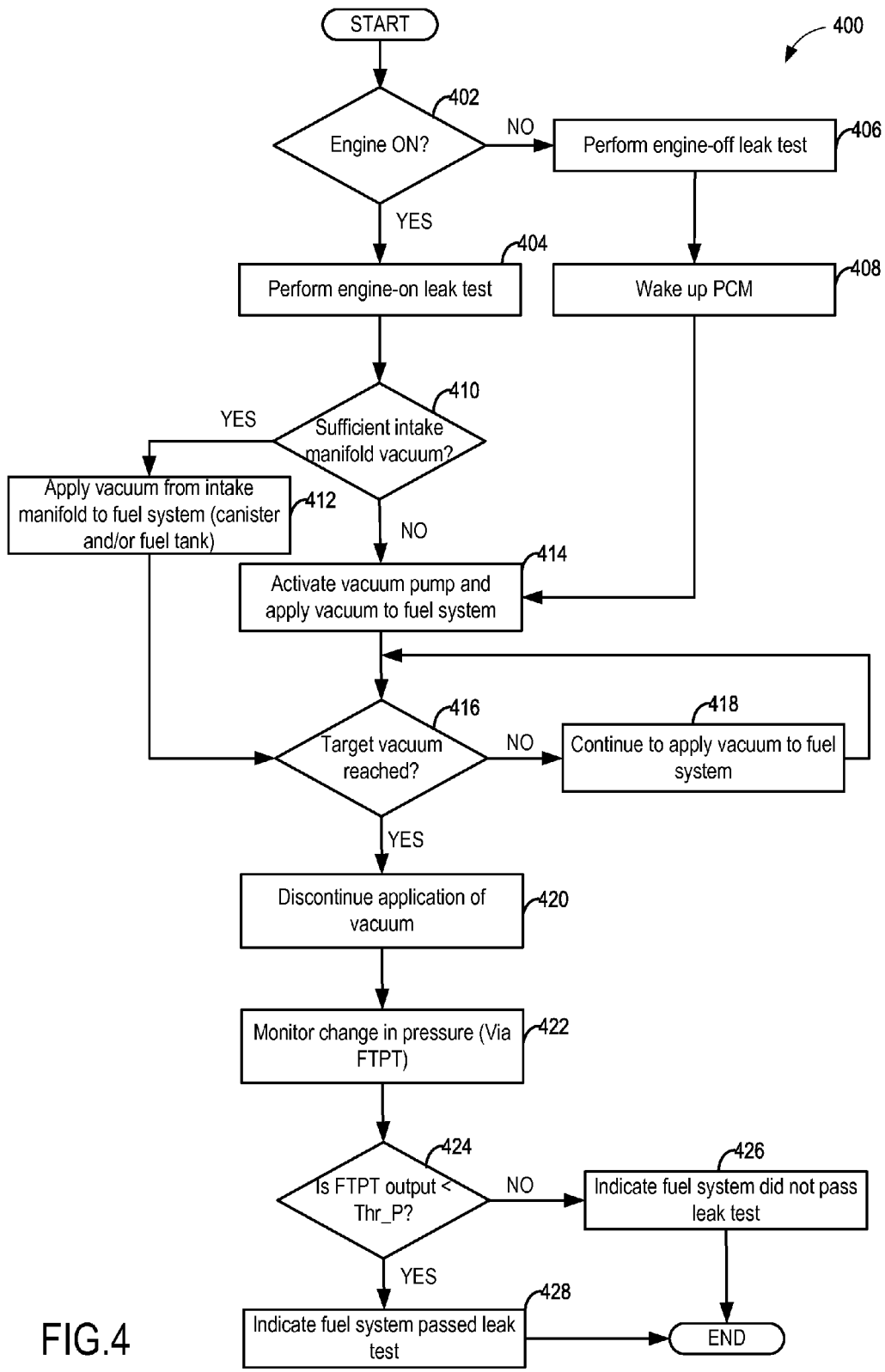
FIG. 4 shows a high level flow chart illustrating a method for detecting leaks in a fuel system.

Turning to FIG. 4, method 400 includes a routine for detecting leaks in a fuel system. Specifically, each of the canister, the first fuel tank, and the second fuel tank may be tested for leaks by applying vacuum and monitoring the output of a common pressure sensor coupled to all of the above. As such, method 400 will be described with relation to the systems shown in FIGS. 1, 2A, 2B, 2C, and 2D, but it should be understood that similar routines may be used with other systems without departing from the scope of this disclosure.

It will be appreciated that the leak test method 400 may be used for each component of the fuel system including the fuel vapor canister, the first fuel tank, and the second fuel tank.

At 402, method 400 includes determining if engine is "ON". The engine may be determined to be "ON" if the engine is activated and operational during a key-on condition. Specifically, the engine may be rotating and combusting. As such, leak detection tests may be performed while the engine is on (engine-on leak test) or while the engine is off (engine-off leak test). If engine is "ON" method 400 proceeds to 404 where an engine-on leak test may be initiated. Engine-on leak test may be performed by either operating a vacuum pump (such as vacuum pump 195 of FIG. 1) and/or using engine intake manifold vacuum. At 410, it may be determined if sufficient intake manifold vacuum exists. In one example, sufficient vacuum (e.g. deep vacuum) may be present in the intake manifold during lower load conditions. In another example, higher vacuum levels may exist in the intake manifold when the intake throttle is mostly closed such that air flow into the intake manifold is significantly lower.

If there is sufficient vacuum in the intake manifold, vacuum may be applied from the intake manifold to the fuel system. For example, if the canister alone is being leak tested, negative pressure generated in the engine intake manifold may be applied to the canister by opening the canister purge valve (CPV) until a threshold level of vacuum is reached in the canister. In another example, if the first fuel tank is being tested for leaks, vacuum may be applied to each of the canister and the first fuel tank. If included, a canister vent valve coupled to the canister and the atmosphere may be closed to further seal the fuel system. However, if there is insufficient intake manifold vacuum, then method 400 proceeds to 414 where a vacuum pump coupled to the canister may be used to apply the vacuum. Insufficient vacuum may include shallow vacuum conditions such as when the intake throttle is mostly open allowing significant air flow into the intake manifold. In response to insufficient vacuum in the intake manifold, the vacuum pump may be activated to apply vacuum to the specific component being tested in the fuel system (e.g., vacuum may be applied to the canister alone at 316 of routine 300). When vacuum is applied to the specific component being tested in the fuel system, pressure in the specific component being tested in the fuel system may decrease. Pressure changes in the fuel system may be monitored by the output of a pressure sensor (such as pressure sensor 120 of FIG. 1) coupled to the canister, the first fuel tank, and the second fuel tank.

Returning to 402, if it is determined that the engine is "OFF", method 400 proceeds to 406 where an engine-off leak test may be performed. The engine may be "OFF" when de-activated during a key-off condition. As such, the engine may be shut down and at rest. Performing the engine-off leak test may include waking up the powertrain control module (PCM) at 408 and applying vacuum to the specific component being tested in the fuel system by operating the vacuum pump at 414. The specific component being tested in the fuel system may include the fuel vapor canister, the first fuel tank, and the second fuel tank. Herein, if the engine is shut down and at rest in the key-off condition, intake manifold vacuum may not be sufficient to perform the leak test.

Irrespective of whether vacuum is applied via intake manifold at 412 or via vacuum pump at 414, method 400 proceeds to 416 where it may be checked if a target vacuum is reached. The target vacuum may depend on the source of vacuum. For example, when intake manifold vacuum is utilized for the leak test, the target vacuum may depend on a degree of opening of the CPV, and/or on a duration the CPV is kept open. If vacuum is applied by operating the vacuum pump, the target vacuum may depend on a duration for which the vacuum pump is operated. It will be appreciated that the target vacuum may also depend on which components of the fuel system are being leak tested. For example, if the canister alone is tested for leaks, the target vacuum for leak testing only the canister may be distinct from a target vacuum used to leak test the first fuel tank.

At 416, if it is determined that target vacuum is not reached, method 400 proceeds to 418, where vacuum may be continued to be applied to the component of the fuel system being leak tested until the target vacuum is reached. In one example, if the vacuum source is the intake manifold, the CPV may be maintained open for a longer duration. In another example, if the vacuum source is the vacuum pump, the vacuum pump may be maintained operational for additional time.

If target vacuum is reached at 416, method 400 proceeds to 420 where application of vacuum may be discontinued. At 420, discontinuing the application of vacuum to the canister may include closing the CPV (if vacuum from intake manifold is applied) and/or deactivating the vacuum pump. Method 400 proceeds to 422 where pressure change as detected by the pressure sensor (e.g., FTPT 120 in FIG.1) coupled to the fuel system may be monitored once the application of vacuum has ceased.

Various methods may be utilized to determine presence of a leak in the fuel system. For example, a rate of change in pressure after ceasing the application of vacuum may be used to determine the presence or absence of leaks. In one example, a fuel system that does not include a leak may have a lower rate of pressure rise (or a slower rate of vacuum decay). However, if the fuel system is degraded and a leak is present, the pressure may rise faster. In other words, vacuum decay may occur at a faster rate. In another example, the change in pressure may be measured as an absolute change. For example, the fuel system may be determined to be degraded when the absolute change in pressure is higher than a threshold pressure level. In one example, pressure in the fuel system may rise higher than the threshold pressure level after discontinuing evacuation of the fuel system. In another example, the monitored change in pressure after ceasing vacuum application may be greater than a threshold change. Herein, if the change in pressure is lower than the threshold change (or pressure rise is lower than the threshold pressure), the fuel system may be determined to be robust and leak-free. It will be noted that alternative examples of leak diagnosis than those described herein may be employed without departing from the scope of this disclosure.

At 424, method 400 determines if the pressure sensor output is lower than a threshold pressure, Thr_P. The threshold pressure, Thr_P, may be different for each component of the fuel system. For example, threshold pressure, Thr_P may be a threshold canister pressure, Thr_Pc, as set at 316 of method 300 if the canister alone is being leak tested. In one example, threshold canister pressure, Thr_Pc, may be based on an expected rise in pressure if a leak exists in the canister. In another example, threshold canister pressure (Thr_Pc) may depend on the size of a reference orifice in the ELCM. A size of the orifice may determine the rate of pressure change, and thus determine threshold Thr_Pc. In another example, Thr_Pc, may be determined based on a duration of applying vacuum. For example, if the canister does not reach the threshold vacuum in a predetermined time, a leak may be indicated. In yet another example, a change in the rate of applied vacuum may also indicate a degraded fuel system.

The threshold pressure, Thr_P, may be different for the first fuel tank and for the second fuel tank, as will be described further below in reference to 338 and 360 of routine 300.

If the output of the pressure sensor is greater than the threshold pressure, Thr_P, then method 400 proceeds to 426 where it may be indicated that the fuel system component being tested for leaks did not pass the leak test. As such, a leak may be present in the component of the fuel system being tested. On the other hand, if the output of the pressure sensor is lower than Thr_P, method 400 proceeds to 428 where it may be indicated that the component of the fuel system being tested passed the leak test. As such, the component may be free of leaks.

While the above described leak test includes applying vacuum (also termed, negative pressure) on the fuel system components, positive pressure may also be utilized for leak testing the fuel system. Herein, a pump may apply positive pressure on the component of the fuel system (or the entire fuel system) until a target positive pressure is reached. The application of positive pressure may then be discontinued and pressure decay, if any, may be monitored. A larger than expected pressure decay (e.g. within a pre-determined duration) may indicate a leak. In the example of a boosted engine, positive pressure from the intake manifold during boosted conditions may also be used to pressurize (with positive pressure) the fuel system for leak testing.

Returning to FIG. 3, at 318 it may be determined if the canister passed the leak test. Specifically, the leak test illustrated in method 400 and described above may be performed on the canister alone. Herein, vacuum may be applied from either the intake manifold (if key-on and engine-on conditions) or via the vacuum pump (if key-on as well as if key-off and engine-off) on the canister alone until a target vacuum for the canister is reached. Further, the canister may be determined to be leak-free if the output of the pressure sensor is lower than the threshold canister pressure, Thr_Pc. As such, the canister may have passed the leak test. If the output of the pressure sensor after terminating vacuum application on the canister is higher than the threshold canister pressure, Thr_Pc, the canister may be degraded and may thus not pass the leak test.

If the canister did not pass the leak test, method 300 proceeds to 320 where a leak in the canister side may be indicated and appropriate diagnostic codes may be set. Further, method 300 proceeds to 322 where the three-way valve may be restored to its normally open position to fluidically couple the canister to each of the two fuel tanks Further still, leak tests on either fuel tank may not be performed at 324 and the method ends. Specifically, if the canister is determined to be degraded, subsequent leak tests on the first fuel tank and the second fuel tank may not be performed.

If the canister has passed the leak test, method 300 proceeds to 326 to determine which fuel tank of the first fuel tank and the second fuel tank has a lower fill level. Specifically, routine 500 of FIG. 5 may be performed at 326 to determine the fuel tank with lower fill level (FT_LF) based on output from respective fuel level sensors of the first fuel tank and the second fuel tank. As such, the fuel tank with the lower fill level may be tested first for leaks. By evacuating the fuel tank with lower fill first, a larger vapor dome may be evacuated thereby yielding sufficient vacuum that may be recycled to the fuel tank with higher fill level (FT_HF) for subsequent leak detection in the fuel tank with higher fill level.

Once FT_LF is determined at 326, method 300 proceeds to 328 where the three-way valve may be adjusted to couple FT_LF with the canister. Further, at 330 the canister and FT_LF may be decoupled from FT_HF. For example, if first fuel tank 20 of FIG. 1 is FT_LF, then the three-way valve may be adjusted to fluidically couple first fuel tank 20 to the canister 22 (e.g. second position of Table 2E). Further still, each of the canister 22 and the first fuel tank 20 may be isolated from second fuel tank 40 by placing the three-way valve in the second position wherein the first solenoid 202 is de-energized and the second solenoid 203 is energized. In this configuration, fuel vapors from FT_LF may flow from FT_LF to the canister. Method 300 then proceeds to 332 where a canister load may be updated based on fuel vapors received from FT_LF. Next, at 334 the leak test routine described in FIG. 4 may be performed on FT_LF using a threshold pressure of threshold FT_LF pressure, Thr_P$_{LF}$. Further, at 336, FT_HF may not be evacuated while FT_LF is being evacuated.

Briefly, vacuum may be applied to FT_LF from a vacuum source during the leak test routine on FT_LF. The vacuum source may be one or more of the vacuum pump and intake manifold vacuum based on key-on or key-off conditions. As such, when leak test is performed during engine-on condition on FT_LF, fuel may be supplied to the engine from FT_HF by operating a fuel pump connected to FT_HF. Specifically, if the first fuel tank has the lower fuel fill, the leak test may be performed initially on the first fuel tank. While the first fuel tank undergoes the leak test routine, the engine may be fueled by fuel from the second fuel tank. Alternatively, if the second fuel tank has the lower fuel fill, the leak test may be performed initially on the second fuel tank. If the engine is operating while the leak test is performed on the second fuel tank, the engine may receive fuel from the first fuel tank.

Vacuum may be applied to FT_LF until a target vacuum is reached. The target vacuum for the FT_LF may be distinct and dissimilar from the target vacuum for the canister leak test performed at 334. Once target vacuum for FT_LF is reached, supply of vacuum to FT_LF from the vacuum source may be discontinued and the change in pressure may be monitored via the output of pressure sensor. The output of the pressure sensor may be compared to the threshold FT_LF pressure, $Thr\_P_{LF}$. The threshold FT_LF pressure $Thr\_P_{LF}$ may depend on the capacity of FT_LF, existing fuel fill level of FT_LF, duration of application of vacuum, etc. As such $Thr\_P_{LF}$ may be different from the threshold canister pressure used for canister leak test, Thr_Pc. For example, $Thr\_P_{LF}$ may be lower than Thr_Pc. In another example, such as where fuel tank capacity is larger as in the case of HD vehicles, $Thr\_P_{LF}$ may be higher than Thr_Pc. If the output of pressure sensor indicates that monitored pressure in the FT_LF is lower than $Thr\_P_{LF}$, the FT_LF passes the leak test. However, if monitored pressure is higher than $Thr\_P_{LF}$, then FT_LF does not pass the leak test. Specifically, FT_LF may be degraded.

Thus, at 338 method 300 includes determining if FT_LF passed the leak test. If FT_LF passed the leak test, then method proceeds to 342 to indicate that FT_LF is leak free. If it is determined that FT_LF did not pass the leak test at 338, method 300 proceeds to 340 to indicate a leak in the fuel tank with lower fill level. In addition, appropriate diagnostic codes (different from the diagnostic code set for canister side leak) may be set. Further, in one optional example, the three-way valve may be adjusted to isolate FT_LF from each of the canister and FT_HF. Further still, in the optional example, the FT_HF may be subsequently diagnosed for leaks by receiving vacuum directly from the vacuum source via the canister. Leak test may be performed on FT_HF as described earlier with reference to FT_LF and method 400 of FIG. 4.

The FT_HF may be diagnosed for leaks subsequent to completing a leak test in the FT_LF. As shown, the leak tests of the FT_LF and FT_HF may be performed sequentially. It will also be noted that if the engine is operating and activated while the FT_HF is tested for leaks, the engine may be fueled by the FT_LF and not by fuel from FT_HF.

Next, at 344, the three-way valve may be adjusted to fluidically couple FT_LF with FT_HF. Specifically, both solenoids of the three-way valve may be de-energized allowing both the fuel tanks to be coupled to each other and to the canister at 346. For example, if first fuel tank 20 of FIG. 1 is FT_LF and second fuel tank 40 is FT_HF, the three-way valve may be adjusted to the third position of FIGS. 2C and 2E, to fluidically couple first fuel tank 20 to each of the canister 22 and second fuel tank 40. In this configuration, the canister may receive additional fuel vapors from FT_HF. As such, the canister may have previously received fuel vapors from FT_LF at 328.

The load of the fuel vapor canister may increase due to the fuel vapors received from FT_HF. Accordingly, the load of the canister may be updated at 348. As mentioned earlier, by testing FT_LF with a larger vapor dome first, a higher amount of vacuum may be provided at first to FT_LF. This larger amount of vacuum may then be recycled to FT_HF with a smaller vapor dome at 350. Specifically, vacuum remaining in FT_LF after completion of the leak test on FT_LF may be transferred to FT_HF to perform the leak test on FT_HF.

Method 300 proceeds to 352 where it may be determined if target vacuum is reached in FT_HF. The target vacuum may depend on one or more of the vacuum received from FT_LF, FT_HF tank capacity, fill level of FT_HF, time for which vacuum is recycled from FT_LF to FT_HF, etc. The target vacuum for FT_HF may, consequently, be different from the target vacuum used for testing FT_LF and the target vacuum for the canister leak test. If target vacuum in FT_HF is not reached e.g. within a specific duration, method 300 proceeds to 354 where additional vacuum may be applied to FT_HF. At 356, the additional vacuum may be provided by operating either the vacuum pump or by applying intake manifold vacuum until the target vacuum is reached in FT_HF. It will be noted that if vacuum still exists in FT_LF, vacuum may be supplied by FT_LF at 356. It will also be noted that if the fuel tanks are being tested during a key-off condition, additional vacuum for the leak test may be supplied primarily by the vacuum pump and not by the intake manifold.

If target vacuum in FT_HF is reached at 352, method 300 proceeds to 358 where the change in pressure may be monitored via the output of the pressure sensor coupled to each of the canister, FT_LF, and FT_HF. As such, if additional vacuum is provided via the intake manifold or the vacuum pump, this supply of additional vacuum may be terminated before monitoring the change in pressure.

Method 300 then proceeds to 360 where it may be determined if pressure sensor output is less than a third threshold such as a threshold FT_HF pressure, $Thr\_P_{HF}$. The threshold FT_HF pressure, $Thr\_P_{HF}$ may depend on the amount of vacuum recycled from FT_LF, a capacity of FT_HF, fill level of FT_HF, etc. As such $Thr\_P_{HF}$ may be different from the threshold used for canister leak test, Thr_Pc and that for FT_LF leak test, $Thr\_P_{LF}$.

If pressure sensor output is lower than $Thr\_P_{HF}$, then method 300 proceeds to 364 where it may be indicated that the fuel tank with higher fill passed the leak test and method 300 ends. As such, FT_HF may be free of leaks. However, if pressure is higher than $Thr\_P_{HF}$, then method 300 proceeds to 362 where it may be indicated that the fuel tank with higher fill did not pass the leak test and method ends. Specifically, leaks may be present in FT_HF and diagnostic codes (different from the diagnostic code set for canister side leak and fuel tank with lower fill leak).

In this way, by testing the fuel tank with lower fill and a larger vapor dome first, a higher amount of vacuum may be provided initially to the fuel tank with higher fill. After completing the leak test in the fuel tank with lower fill, this larger amount of vacuum may then be recycled to fuel tank with higher fill (or smaller vapor dome). By reusing vacuum from the fuel tank with lower fill to test the fuel tank with higher fuel fill for leaks, the cycle time for testing the entire fuel system may be reduced. If a vacuum pump is utilized for the leak test, recycling vacuum from the fuel tank with lower fill to the fuel tank with higher fill may also decrease the duration of operating the vacuum pump enabling a reduction in power consumption. It will be appreciated that the canister is tested for leaks prior to initiating leaks tests in either fuel tank.

Figure 5:
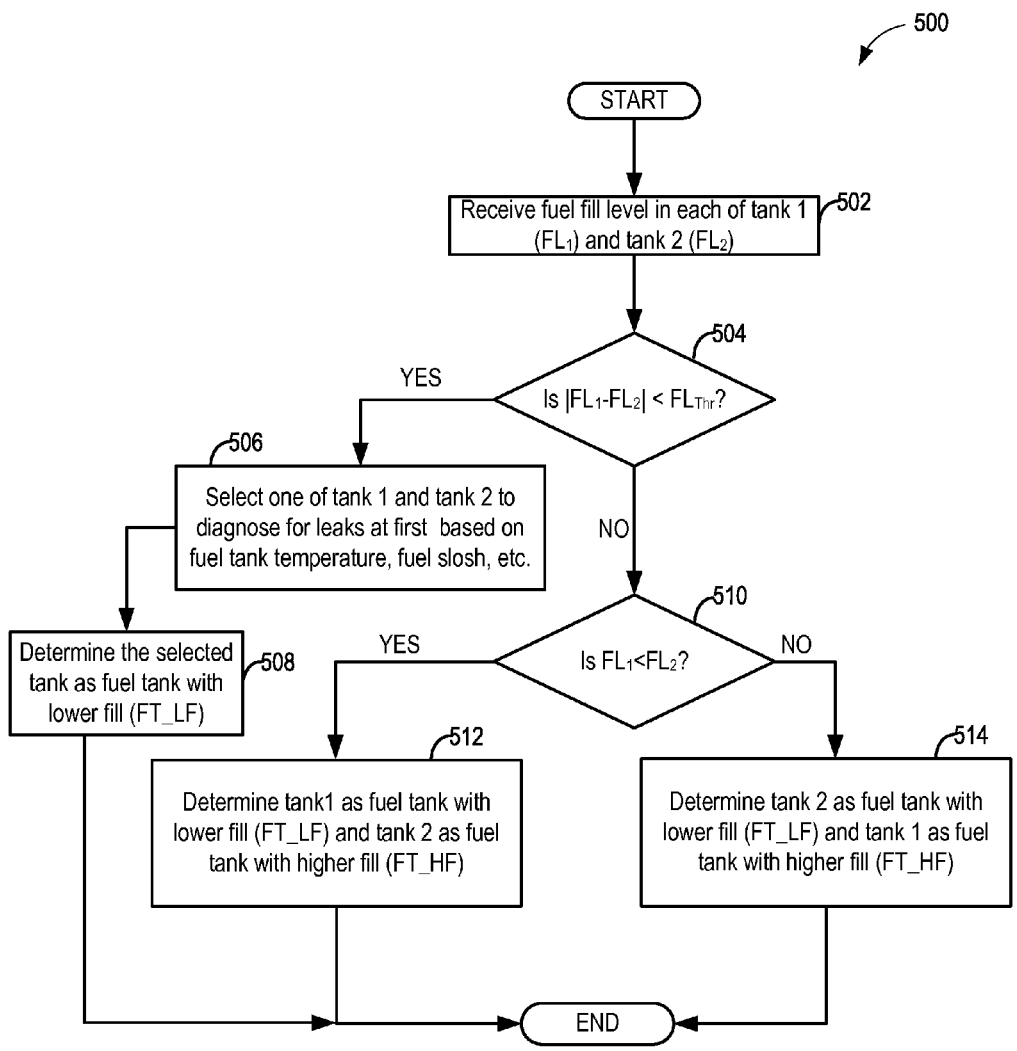
FIG. 5 shows a high level flow chart illustrating a method for determining a fuel tank with lower fill level (FT_LF) and a fuel tank with higher fill level (FT_HF).

Turning now to FIG. 5, a method 500 for determining a fuel tank with lower fill level (FT_LF) and a fuel tank with higher fill level (FT_HF) is shown. Specifically, fuel level sensors in each of the fuel tanks may be utilized to determine if the first fuel tank or the second fuel tank has a lower fuel fill. Method 500 will be described with relation to the system shown in FIG. 1, but it should be understood that similar routines may be used with other systems without departing from the scope of this disclosure.

At 502, fuel fill level in each of the first fuel tank and the second fuel tank may be received. The fill level of the fuel tanks may be determined from the output of fuel level sensors (such as sensors 106 and 107 of FIG. 1) coupled to each of the fuel tanks. The fill level of the first fuel tank (tank 1) may be determined as $FL_1$, and the fill level of the second fuel tank (tank 2) may be determined as $FL_2$.

Method 500 then proceeds to 504 where it may be determined if the absolute value of the difference between the tank fills (e.g., $|FL_1-FL_2|$) is lower than a threshold, $FL_{Thr}$. In one example, $FL_{Thr}$ may be 5%. For example, if the absolute difference in fuel fill levels between first fuel tank and second fuel tank is greater than 5%, the fuel fill levels may be deemed to be substantially unequal. In another example, if the absolute difference between the fuel fill level of the first fuel tank and the second fuel tank is higher than 10%, it may be determined that the two fuel tanks have unequal fill levels. If $|FL_1-FL_2|$ is higher than $FL_{Thr}$, the fill levels of the two tanks may be determined to be unequal, and method 500 proceeds to 510 where it may be determined if $FL_1$ is lower than $FL_2$. If FL1 is lower than FL2, method 500 proceeds to 512 where tank 1 (or the first fuel tank) may be determined as the fuel tank with lower fill level (FT_LF) and tank 2 (or the second fuel tank) may be determined as the fuel tank with higher fill level (FT_HF) and the method ends. However, if FL1 is higher than FL2, method 500 proceeds to 514 where tank 2 (or the second fuel tank) may be determined as the fuel tank with lower fill level (FT_LF) and tank 1 (or the first fuel tank) may be determined as the fuel tank with higher fill level (FT_HF) and the method ends.

When the difference between the fill levels of the two fuel tanks is smaller or $|FL_1-FL_2|$ is determined to be lower than $FL_{Thr}$, at 504, the two fuel tanks may have substantially equal fuel fill. In one example, if the difference between the fuel fill level of the first fuel tank and the second fuel tank is lower than 5%, it may be determined that the first fuel tank has a substantially similar fuel fill as the second fuel tank. In another example, if the difference between the fuel fill level of the first fuel tank and the second fuel tank is lower than 7%, it may be determined that the first fuel tank has a substantially similar fuel fill as the second fuel tank.

Method 500 proceeds to 506 where one of the first fuel tank and the second fuel tank may be selected to diagnose for leaks first based on one or more of fuel tank temperature, level of fuel slosh, etc. In one example, if the second fuel tank has a higher temperature than the first fuel tank, the second fuel tank may be selected to be tested first. As such, the higher fuel tank temperature may cause a higher pressure in the second fuel tank relative to that in the first fuel tank. Herein, the fuel tank with higher tank temperature may be evacuated first, and vacuum from the fuel tank with higher tank temperature may be recycled to the fuel tank with lower temperature.

As another example, if the second fuel tank has more fuel slosh than the first fuel tank (e.g., sensor 106 is noisier than sensor 107 due to fuel sloshing in tank 1 more than tank 2, for example), then the first fuel tank may be tested for leaks prior to testing the second fuel tank. Method 500 then proceeds to 508 where the selected tank may be determined as FT_LF whereas the remaining tank may be determined as FT_HF. In the example above where the second fuel tank is a higher temperature than the first fuel tank, the second fuel tank may be selected as FT_LF while the first fuel tank may be determined as FT_HF. In the example where the second fuel tank has a higher level of fuel slosh, the first fuel tank may be determined as FT_LF while the second fuel tank may be determined as FT_HF. As such, the fuel tank determined as FT_LF may be tested for leaks before testing the FT_HF.

Thus, if it is determined that the first fuel tank and the second fuel tank have substantially similar fill levels, one of the first fuel tank and the second fuel tank may be selected for leak testing before the other (or the remaining fuel tank of the first fuel tank and the second fuel tank). As in the examples above, the selection of one of the first fuel tank and the second fuel tank may be based on fuel tank temperature and/or level of fuel slosh. Specifically, the selection may not be based upon fuel fill level when the first fuel tank and the second fuel tank have similar fuel fill levels.

In an alternative example, if the fuel tanks have substantially equal fill, fuel may be transferred from one tank to the other by operating a jet pump, such as jet pump 24 of FIG. 1, in order to create a difference in the fill levels. The tank from which fuel was transferred may be determined as FT_LF and the tank that received the fuel may be determined s FT_HF, and the leak test may be performed on FT_LF first followed by FT_HF. In one example, fuel may be transferred from the first fuel tank to the second fuel tank by operating the jet pump for a predetermined duration. In this way, a known amount of fuel may be transferred from the first fuel tank to the second fuel tank, thereby creating a known difference in the fill levels of the two tanks. Fuel may be transferred via a passageway, such as fuel transfer passage 34 of FIG. 1, that is distinct from the conduits for recycling vacuum or transferring fuel vapors, for example. Further, the pressure thresholds for the leak tests may be readjusted responsive to an amount of fuel transfer from the first fuel tank to the second fuel tank.

Thus, an example method for a fuel system in an engine may comprise applying vacuum to a first fuel tank to identify leaks in the first fuel tank and recycling the vacuum from the first fuel tank to a second fuel tank to identify leaks in the second fuel tank following identifying leaks in the first fuel tank. Herein, cycle time of the leak test may be saved since vacuum from the first fuel tank is reused for leak testing the second fuel tank. In the above example method, the first fuel tank may have a lower fuel fill than the second fuel tank. Thus, the first fuel tank may be FT_LF while the second fuel tank may be FT_HF. Responsive to the second fuel tank having a lower fuel fill than the first fuel tank, vacuum may be applied at first to the second fuel tank to identify leaks in the second fuel tank, and then recycling the vacuum from the second fuel tank to the first fuel tank to identify leaks in the first fuel tank. However, when the first fuel tank and the second fuel tank have substantially equal fuel fill, one of the first fuel tank and the second fuel tank may be selected based on one or more of fuel temperature, level of fuel slosh, etc.

The method may further include applying vacuum at first to the one selected fuel tank to identify leaks in the one selected fuel tank, and then recycling vacuum from the one selected fuel tank to a remaining fuel tank to identify leaks in the remaining fuel tank. The vacuum may be applied via a vacuum source during a key-off condition, and the vacuum source may include a vacuum pump.

The method may include identifying leaks in a fuel system canister prior to applying the vacuum to the first fuel tank. Further, each of the first fuel tank and the second fuel tank may be isolated from the canister while identifying leaks in the fuel system canister by adjusting a valve (e.g., three-way valve 110 of FIG. 1) to a first position, the valve coupled to each of the fuel system canister, the first fuel tank, and the second fuel tank. Applying vacuum to the first fuel tank may include adjusting the valve to a second position to enable fluidic communication between the first fuel tank and the fuel system canister. Recycling vacuum from the first fuel tank to the second fuel tank may include adjusting the valve to a third position to enable fluidic communication between the first fuel tank, the second fuel tank, and the fuel system canister. Further, leaks in the fuel system canister, leaks in the first fuel tank, and leaks in the second fuel tank may be identified using a common pressure sensor. The method may also include indicating a leak in the first fuel tank in response to a pressure in the first fuel tank being higher than a first threshold pressure ($Thr\_P_{LF}$), indicating a leak in the second fuel tank in response to a pressure in the second fuel tank being higher than a second threshold pressure ($Thr\_P_{HF}$). Herein, the second threshold pressure may be different from the first threshold pressure. The second threshold pressure may be based on the vacuum recycled from the first tank to the second tank. When vacuum is applied via a vacuum source during a key-on condition, the vacuum source may be one of intake manifold vacuum and a vacuum pump. Furthermore, the engine may be fueled via the second fuel tank while identifying leaks in the first fuel tank, and wherein the engine is fueled via the first fuel tank while identifying leaks in the second fuel tank.

Turning now to FIG. 6, map 600 shows an example leak detection test when fill levels in the fuel tanks are significantly different. Plot 602 of map 600 depicts results of leak tests in the canister, the first fuel tank (Tank 1), and the second fuel tank (Tank 2). Plot 604 shows the position of the common three-way valve, such as three-way valve 110 of FIG. 1, coupled to each of the canister, tank 1, and tank 2. Plot 606 with solid lines and plot 608 with dot-dashed lines show the respective fill levels of tank 2 and tank 1. Plot 610 with larger dashed lines and plot 612 with smaller dashed lines show the fuel tank temperatures of tank 1 and tank 2 respectively. Plot 620 indicates the output of a pressure sensor coupled to each of the canister, tank 1, and tank 2. Plot 622 shows the operation of a vacuum pump. As such, the depicted example leak test may be performed when the engine is deactivated and not combusting such as during a key-off condition. Lines 614, 616, and 618 represent the canister threshold pressure ($Thr\_P_C$), FT_HF threshold pressure ($Thr\_P_{HF}$), and FT_LF threshold pressure ($Thr\_P_{LF}$), respectively. For each plot, time is depicted along the x (horizontal) axis while values of each respective parameter are depicted along the y (vertical) axis. Further, time increases from the left hand side of the x-axis to the right hand side.

At time $t_0$, the three-way valve may be in the normally open position (or third position) where the canister may be fluidically coupled to each of tank 1 and tank 2 as indicated by plot 604. In this position, both the solenoids of the three-way valve may be de-energized. Further, the pressure in the fuel system as indicated by the output of a fuel tank pressure transducer (FTPT) is higher than any of the thresholds (plot 620). Tank 2 may have higher fill level than tank 1, as indicated by 606 and 608. The vacuum pump may be off, as indicated by 622.

At $t_1$, a leak test may be initiated. As described earlier, a leak test may be initiated when a threshold time has elapsed since a previous leak test, for example. First, the canister may be evacuated to perform leak test on the canister. The canister side leak test may be performed prior to testing either fuel tank since the canister is fluidically coupled between each fuel tank and the vacuum source. By testing the canister at first, leaks in either fuel tank may be detected with higher accuracy. Accordingly, the three-way valve may be adjusted initially to a first position to isolate the canister from each of tank 1 and tank 2 at t1. In this first position, both the solenoids of the three-way valve may be energized. Vacuum may then be applied to the canister. Applying vacuum to the canister may include activating the vacuum pump at $t_1$. However, it may be appreciated if the leak test is performed when engine is on, it may be possible to apply manifold vacuum to the canister by opening the purge valve, as described earlier. As such, adjusting the three-way valve position and applying vacuum to the canister may be performed sequentially or concurrently.

Between $t_1$ and $t_2$, vacuum may be applied to the canister as shown by the vacuum pump remaining active between $t_1$ and $t_2$. In response to the application of vacuum to the canister, the FTPT output may decrease as indicated by curve 620. At $t_2$, a target vacuum may be reached upon which the pump may be deactivated as indicated by plot 622. Further, the canister may be sealed from the atmosphere as the vacuum pump is deactivated.

Between $t_2$ and $t_3$, FTPT output may be monitored to determine leaks in the canister. For example, the duration between $t_2$ and $t_3$ may be a pre-determined duration. As depicted in map 600, pressure in the canister (since the remaining components of the fuel system are isolated from the canister) may rise slightly. At $t_3$, pressure in the canister as determined by FTPT output is below the first threshold, Thr_Pc (line 614) and the canister may be determined to be leak free as indicated by 602. Upon completing the leak test on the canister, the fuel tank with lower fill level may be tested next. In particular, the leak test of the fuel tanks may be initiated only if the canister is determined to be free of leaks.

At $t_3$, fill level in tank 1 is lower than the fill level of tank 2. Accordingly, tank 1 may be evacuated first and the leak test may be performed on tank 1 initially. Thus, vacuum may be applied on tank 1 at $t_3$ by shifting the three-way valve to the second position as indicated by plot 604. In this position, of the first solenoid coupling tank 1 to the canister may be de-energized, while the second solenoid coupling tank 2 to the canister may be maintained energized. The vacuum pump may be activated simultaneously at $t_3$ to apply vacuum to tank 1. As mentioned earlier, adjusting the three-way valve position and activating the pump may be performed sequentially or concurrently. Between $t_3$ and $t_4$, tank 1 may be evacuated as indicated by a decrease in FTPT output. At $t_4$, a target vacuum for tank 1 may be reached, and the vacuum pump may be deactivated as indicated by plot 622. Between $t_4$ and $t_5$, FTPT output may be monitored to determine leaks in tank 1. As shown in map 600, pressure in tank 1 (and canister) increases gradually between $t_4$ and $t_5$. However, by $t_5$, FTPT output (or pressure in tank 1) may be below the threshold, Thr_$P_{LF}$ (618). Accordingly, tank 1 may be determined to be leak free as indicated by plot 602.

Upon determining that tank 1 is leak free, tank 2 may now be tested for leaks. Herein, the vacuum in tank 1 may be recycled to tank 2 by adjusting the three-way valve to the third position. In the third position, both the solenoids of the three-way valve may be de-energized enabling fluidic communication between tank 1 and tank 2, as well as fluidic communication between each of tank 1, tank 2, and the canister. Further, the vacuum pump may be maintained deactivated as sufficient vacuum may be transferred from tank 1 to tank 2. Specifically, a desired target vacuum may be provided to tank 2 from tank 1.

Upon modifying the position of the three-way valve to the third position, FTPT output may indicate a slight increase as the pressure sensor may be detecting the pressure in tank 2. Between $t_5$ and $t_6$, the pressure of the fuel system (including canister, tank 1, and tank 2) may reach an equilibrium. For example, a target vacuum level may be reached in tank 2 by $t_6$. As will be observed, target vacuum for tank 2 may be distinct from (e.g., higher than) target vacuum for tank 1. Once the vacuum from tank 1 is transferred to tank 2 and the desired target vacuum level is reached, FTPT output may be monitored again to determine if tank 2 is leak free. Between $t_6$ and $t_7$, pressure in tank 2 may increase slightly. As such, by $t_7$ FTPT output remains below the third threshold, Thr_$P_{HF}$ (616), and tank 2 may be determined to be leak free as indicated by 602.

If vacuum from tank 1 is insufficient such that the desired target vacuum is not attained in tank 2 by $t_6$, vacuum pump may be activated at $t_5$ to further evacuate tank 2.

Thus, an example method for a fuel system in an engine is shown, comprising adjusting a three-way valve to fluidically couple a first fuel tank to a vacuum source via a fuel system canister. The vacuum source may apply vacuum to the first fuel tank to diagnose the first fuel tank for leaks. The three-way valve may be further modified to fluidically couple the first fuel tank to a second fuel tank after diagnosing the first fuel tank for leaks and vacuum may be transferred from the first fuel tank to the second fuel tank to diagnose the second fuel tank for leaks. The three-way valve may block fluidic communication between the first fuel tank and the second fuel tank while diagnosing the first fuel tank for leaks. The second fuel tank may be diagnosed for leaks sequentially after diagnosing the first fuel tank for leaks to distinguish degradation between the first fuel tank and the second fuel tank. The method may further include diagnosing the fuel system canister for leaks prior to diagnosing the first fuel tank for leaks, and diagnosing the fuel system canister for leaks may include adjusting the three-way valve to decouple the fuel system canister from each of the first fuel tank and the second fuel tank. In this way, the leaks in each of the canister, the first fuel tank and the second fuel tank may be diagnosed.

Turning now to FIG. 7, map 700 shows an example leak detection test when fill levels in the fuel tanks are substantially equal. Plot 702 of map 700 depicts results of leak tests in the canister, the first fuel tank (Tank 1), and the second fuel tank (Tank 2). Plot 704 shows the position of the three-way valve coupled to each of the canister, tank 1, and tank 2. Plot 706 and plot 708 (dot-dash line) show the respective fill levels of tank 2 and tank 1. Plots 710 (medium dashes) and 712 (small dashes) show the fuel tank temperatures of tank 2 and tank 1 respectively. Plot 720 shows the output of a pressure sensor coupled to each of the canister, tank 1, and tank 2. Herein, a single pressure sensor may be utilized to sense pressure changes in the entire fuel system.

Plot 722 shows the operation of a vacuum pump. As such, the depicted example leak test may be performed when the engine is deactivated and not combusting such as during a key-off condition. Lines 714, 716, and 718 represent the canister threshold pressure (Thr_$P_C$), FT_HF threshold pressure (Thr_$P_{HF}$), and FT_LF threshold pressure (Thr_$P_{LF}$), respectively. For each plot, time is depicted along the x (horizontal) axis while values of each respective parameter are depicted along the y (vertical) axis.

At time $t_0$, the pressure in the fuel system is indicated by the output of a fuel tank pressure transducer (FTPT) and is higher than any of the thresholds as shown by plot 720. As described with reference to FIG. 6, the three-way valve may be in the normally open position or third position where the canister may be fluidically coupled to each of tank 1 and tank 2 as indicated by plot 604. The vacuum pump may be deactivated, as indicated by plot 722.

At $t_1$, a leak test may be initiated. As described earlier, the three-way valve may be adjusted to a first position to isolate the canister from each of tank 1 and tank 2 as indicated by plot 704. In addition, vacuum may be applied to the canister by activating the vacuum pump as indicated by plot 722. Between $t_1$ and $t_2$, vacuum may be applied to the canister as shown by the vacuum pump remaining active between $t_1$ and $t_2$. In response to the application of vacuum, the FTPT output may begin to decrease as indicated by plot 720.

At $t_2$, a target vacuum may be reached upon which the vacuum pump may be deactivated as indicated by plot 722. Between $t_2$ and $t_3$, FTPT output may be monitored to determine leaks in the canister. For example, the duration between $t_2$ and $t_3$ may be a pre-determined duration. As depicted in map 700, pressure in the canister (since the remaining components of the fuel system are isolated from the canister) may rise slightly. At $t_3$, pressure in the canister as determined by FTPT output is below the threshold, Thr_Pc (714) as indicated by plot 720 and the canister may be determined to be leak free as indicated by 702. Upon completing the leak test on the canister, the fuel tank with lower fill level may be tested next. In particular, the leak test of the fuel tanks may be initiated only if the canister is determined to be free of leaks.

At $t_3$, it may be determined that the two fuel tanks have substantially equal fill levels. When the fill levels in the two tanks are substantially equal, other parameters such as fuel tank temperature, level of fuel slosh etc. may be evaluated. At $t_3$, the fuel tank temperatures may be compared by comparing plots 710 and 712. Since tank 2 is at a higher temperature (thus higher pressure) than tank 1, tank 2 may be evacuated first. Applying vacuum to tank 2 may include adjusting the three-way valve to the fourth position as indicated by plot 704 and applying vacuum by activating the vacuum pump as indicated by plot 722. Between $t_3$ and $t_4$, tank 2 may be evacuated as indicated by a decrease in FTPT output. At $t_4$, a target vacuum may be reached, and the vacuum pump may be deactivated as indicated by plot 722. Between $t_4$ and $t_5$, FTPT output may be monitored to determine leaks in tank 2. As shown in map 700, pressure in tank 2 (and canister) increases gradually between $t_4$ and $t_5$. However, by $t_5$, FTPT output may be below the threshold, 718. As such the duration between $t_4$ and $t_5$ may be a pre-determined duration for monitoring the fuel tank for leaks. Accordingly, at $t_5$ tank 2 may be determined to be leak free as indicated by 702.

Upon determining that tank 2 is leak free, tank 1 may now be tested for leaks. Herein, the vacuum remaining in tank 2 may be recycled to tank 2, by adjusting the three-way valve to the third position at $t_5$ as indicated by plot 704. The vacuum pump may be maintained deactivated as indicated by 722. However, if tank 2 vacuum is insufficient, vacuum pump may be activated at $t_5$ to further evacuate tank 1 to target vacuum and FTPT output may be monitored to determine if tank 1 is leak free.

FTPT output may indicate a slight increase between $t_5$ and $t_6$ as the pressure sensor may be detecting the pressure in tank 2. By $t_6$, the pressure of the fuel system (including canister, tank 1, and tank 2) may reach an equilibrium. For example, a target vacuum level may be reached in tank 1 by $t_6$. As will be observed, target vacuum for tank 1 may be distinct from (e.g. higher than) target vacuum for tank 2. Once the vacuum from tank 2 is transferred to tank 1 and the desired target vacuum level is reached, FTPT output may be monitored again to determine if tank 1 is leak free. Between $t_6$ and $t_7$, pressure in tank 1 may increase steadily and by $t_7$, FTPT output may be higher than threshold 716. Accordingly, at $t_7$ tank 1 may be determined to be degraded, as indicated by 702. In this way, it may be possible to determine leaks in the fuel system.

The systems described herein and with regard to FIGS. 1 and 2 along with the methods described herein and with regard to FIGS. 3, 4 and 5 may enable one or more systems and one or more methods. An example system for a vehicle may comprise an engine receiving fuel from each of a first fuel tank and a second fuel tank, a canister for storing fuel vapors from each of the first fuel tank and the second fuel tank, a common valve coupled to each of the canister, the first fuel tank, and the second fuel tank, the three-way valve including a first solenoid and a second solenoid, a fuel tank pressure sensor coupled to each of the canister, the first fuel tank, and the second fuel tank, a first fuel level sensor coupled to the first fuel tank for estimating a fill level of the first fuel tank, and a second fuel level sensor coupled to the second fuel tank for estimating a fill level of the second fuel tank. The system may also include a controller with computer readable instructions stored on non-transitory memory that when executed may, responsive to a first condition, energize the second solenoid of the common valve while de-energizing the first solenoid of the common valve and connect the first fuel tank to the canister while blocking connection between the second fuel tank and each of the first fuel tank and the canister via the common valve. Further, in response to a second condition, the controller may de-energize the second solenoid of the common valve while maintaining the first solenoid de-energized and connect the second fuel tank with each of the canister and the first fuel tank. In such an example, the first condition may include performing a leak test with the first fuel tank having a lower fuel fill level than the second fuel tank, and the second condition may include completion of the leak test on the first fuel tank and initiation of a subsequent leak test on the second fuel tank.

The controller may include further instructions to, responsive to a desired leak test with the second fuel tank having a lower fuel fill level than the first fuel tank, energize the first solenoid of the common valve while de-energizing the second solenoid of the common valve, thereby connecting the second fuel tank to the canister via the common valve while blocking connection between the first fuel tank and each of the canister and the second fuel tank via the common valve. Further in response to completing the leak test on the second fuel tank and initiating a subsequent leak test on the first fuel tank, the controller may de-energize the first solenoid of the common valve while maintaining the second solenoid de-energized, thus connecting the first fuel tank with each of the canister and the second fuel tank.

In another representation, an example system is shown, the system comprising an engine receiving fuel from each of a first fuel tank and a second fuel tank, a canister for storing fuel vapors from each of the first fuel tank and the second fuel tank, a fuel tank pressure sensor coupled to each of the canister, the first fuel tank, and the second fuel tank, a first fuel level sensor coupled to the first fuel tank for estimating a fuel fill level of the first fuel tank, a second fuel level sensor coupled to the second fuel tank for estimating a fill level of the second fuel tank and a valve coupled to each of the canister, the first fuel tank, and the second fuel tank, the valve including a first solenoid and a second solenoid. The example system may also include a controller with computer readable instructions stored on non-transitory memory that may be configured to energize each of the first solenoid and the second solenoid of the valve to place the valve in a first position blocking the canister from each of the first fuel tank and the second fuel tank, de-energize the first solenoid and energize the second solenoid of the valve to place the valve in a second position to connect the first fuel tank to the canister while blocking connection between the second fuel tank and the canister. The controller may further de-energize each of the first solenoid and the second solenoid to place the valve in a third position connecting the canister to each of the first fuel tank and the second fuel tank. The controller may additionally energize the first solenoid and de-energize the second solenoid to place the valve in a fourth position connecting the second fuel tank to the canister and blocking connection between the first fuel tank and the canister. The controller may include further instructions for initially placing the valve in the second position in response to a desired leak test in each of the first fuel tank and the second fuel tank when fuel fill level of the first fuel tank is lower than that in the second fuel tank. The controller may include further instructions for modifying the valve to the third position to perform the desired leak test in the second fuel tank immediately after completing the desired leak test in the first fuel tank. The controller may include additional instructions for initially placing the valve in the fourth position in response to a desired leak test in each of the first fuel tank and the second fuel tank when fuel fill level in the second fuel tank is lower than the first fuel tank. Further, the controller includes instructions for subsequently modifying the valve to the third position to perform the desired leak test in the first fuel tank immediately after completing the desired leak test in the second fuel tank. The controller includes additional instructions for responsive to substantially equal fill in the first fuel tank and the second tank, selecting one of the first fuel tank and the second fuel tank to perform the desired leak test initially based on fuel tank temperature, level of fuel slosh etc., and adjusting the valve to either the second position or the fourth position based on selected fuel tank. The controller may also include instructions for placing the valve in the first position while leak testing the canister alone.

In another representation, an example method for an engine fuel system may comprise performing a leak test on each of a first fuel tank and a second fuel tank in a sequential manner based on a fuel fill level in each of the first fuel tank and the second fuel tank, the leak test using recycled vacuum. The leak test may be performed initially on the first fuel tank and subsequently on the second fuel tank responsive to fuel fill level in the first fuel tank being lower than the fuel fill level in the second fuel tank. Herein, the vacuum may be recycled from the first fuel tank to the second fuel tank to perform the leak test on the second fuel tank after completing the leak test in the first fuel tank. The method may further comprise transferring fuel from the first fuel tank to the second fuel tank via a passage in response to detecting a leak in the first fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for performing leak testing in a fuel system of a vehicle engine, comprising:
    applying vacuum to a first fuel tank having a lower fuel fill level than a second fuel tank, including:
        applying vacuum to the first fuel tank via a vacuum pump, then ceasing the application of vacuum, monitoring pressure changes in the fuel system based on output from a pressure sensor arranged in the fuel system, and determining whether there is a leak in the first fuel tank based on the monitored pressure changes; and then
        transferring the vacuum from the first fuel tank to the second fuel tank, then ceasing the transfer of vacuum, monitoring pressure changes in the fuel system based on output from the pressure sensor, and determining whether there is a leak in the second fuel tank based on the monitored pressure changes.

2. The method of claim 1, further comprising measuring and comparing fuel fill levels of the first and second fuel tanks.

3. The method of claim 2, further comprising, when the fuel fill level of the second fuel tank is lower than the fuel fill level of the first fuel tank:
    applying the vacuum at first to the second fuel tank via the vacuum pump, then ceasing the application of vacuum, monitoring pressure changes in the fuel system based on output from the pressure sensor, and determining whether there is a leak in the second fuel tank based on the monitored pressure changes; and then
    transferring the vacuum from the second fuel tank to the first fuel tank, then ceasing the transfer of vacuum, monitoring pressure changes in the fuel system based on output from the pressure sensor, and determining whether there is a leak in the first fuel tank based on the monitored pressure changes.

4. The method of claim 3, further comprising, when the first fuel tank and the second fuel tank have substantially equal fuel fill levels:
    estimating fuel temperature and a level of fuel slosh in each of the first and second fuel tanks;
    selecting one of the first fuel tank and the second fuel tank based on one or more of the estimated fuel temperatures and levels of fuel slosh, applying vacuum at first to the one selected fuel tank via the vacuum pump, then ceasing the application of vacuum, monitoring pressure changes in the fuel system based on output from the pressure sensor, and determining whether there is a leak in the one selected fuel tank based on the monitored pressure changes; and then
    transferring the vacuum from the one selected fuel tank to a remaining fuel tank, then ceasing the transfer of vacuum, monitoring pressure changes in the fuel system based on output from the pressure sensor, and determining whether there is a leak in the remaining fuel tank based on the monitored pressure changes.

5. The method of claim 1, further comprising identifying leaks in a fuel system canister prior to applying the vacuum to the first fuel tank, and wherein each of the first fuel tank and the second fuel tank is isolated from the fuel system canister while identifying leaks in the fuel system canister by adjusting a valve to a first position, the valve coupled to each of the fuel system canister, the first fuel tank, and the second fuel tank.

6. The method of claim 5, wherein the applying of vacuum to the first fuel tank includes adjusting the valve to a second position in which the first fuel tank and the fuel system canister are in fluidic communication.

7. The method of claim 6, wherein transferring vacuum from the first fuel tank to the second fuel tank includes adjusting the valve to a third position in which the first fuel tank, the second fuel tank, and the fuel system canister are in fluidic communication.

8. The method of claim 5, wherein the pressure sensor is used to identify leaks in the fuel system canister, leaks in the first fuel tank, and leaks in the second fuel tank.

9. The method of claim 8, further comprising indicating a leak in the first fuel tank in response to a pressure in the first fuel tank being higher than a first threshold pressure.

10. The method of claim 9, further comprising indicating a leak in the second fuel tank in response to a pressure in the second fuel tank being higher than a second threshold pressure, the second threshold pressure being different from the first threshold pressure.

11. The method of claim 10, wherein the second threshold pressure is based on the vacuum transferred from the first fuel tank to the second fuel tank.

12. The method of claim 1, further comprising:
when the vehicle engine is on,
applying vacuum to the first fuel tank via one of intake manifold vacuum and the vacuum pump, then ceasing the application of vacuum, monitoring pressure changes in the fuel system based on output from the pressure sensor, and determining whether there is a leak in the first fuel tank based on the monitored pressure changes; and then
transferring the vacuum from the first fuel tank to the second fuel tank, then ceasing the transfer of vacuum, monitoring pressure changes in the fuel system based on output from the pressure sensor, and determining whether there is a leak in the second fuel tank based on the monitored pressure changes.

13. The method of claim 1, wherein the vehicle engine is fueled via the second fuel tank while identifying leaks in the first fuel tank, and wherein the vehicle engine is fueled via the first fuel tank while identifying leaks in the second fuel tank.

14. A method for a fuel system in an engine, comprising:
adjusting a three-way valve to fluidically couple a first fuel tank to a vacuum source via a fuel system canister, then applying vacuum from the vacuum source to the first fuel tank, then ceasing the application of vacuum, monitoring pressure changes in the fuel system based on output from a pressure sensor arranged in the fuel system, and determining whether there is a leak in the first fuel tank based on the monitored pressure changes; and then
modifying the three-way valve to fluidically couple the first fuel tank to a second fuel tank, then transferring the vacuum from the first fuel tank to the second fuel tank, then ceasing the transfer of vacuum, monitoring pressure changes in the fuel system based on output from the pressure sensor, and determining whether there is a leak in the second fuel tank based on the monitored pressure changes.

15. The method of claim 14, wherein the three-way valve blocks fluidic communication between the first fuel tank and the second fuel tank while diagnosing the first fuel tank for leaks, and wherein diagnosing the second fuel tank for leaks is performed sequentially after diagnosing the first fuel tank for leaks to distinguish degradation between the first fuel tank and the second fuel tank.

16. The method of claim 14, further comprising diagnosing the fuel system canister for leaks prior to diagnosing the first fuel tank for leaks, and wherein diagnosing the fuel system canister for leaks includes adjusting the three-way valve to decouple the fuel system canister from each of the first fuel tank and the second fuel tank.

17. A method for diagnosing leaks in a fuel system of an engine, comprising:
estimating fuel fill levels in at least two fuel tanks; and
sequentially performing leak tests for two or more of the at least two fuel tanks in order of their fuel fill levels, from lowest to highest.

18. The method of claim 17, wherein the fuel fill levels are estimated using fuel level sensors positioned in each of the at least two fuel tanks.

19. The method of claim 17, wherein performing a leak test for a fuel tank of the at least two fuel tanks comprises:
applying vacuum to the fuel tank undergoing the leak test; and then
ceasing application of the vacuum, monitoring changes in pressure in the fuel system with a pressure sensor arranged in the fuel system, and determining whether there is a leak in the fuel tank based on the monitored pressure changes.

* * * * *